(12) United States Patent
Erdogan et al.

(10) Patent No.: US 11,447,408 B2
(45) Date of Patent: Sep. 20, 2022

(54) COMBINATION OF CAPTIVATOR AND FIXED FILM BIOREACTOR SOLUTIONS

(71) Applicant: Evoqua Water Technologies LLC, Pittsburgh, PA (US)

(72) Inventors: Argun O. Erdogan, Greenfield, WI (US); Michael L. Doyle, Wauwatosa, WI (US); Deborah Hyke, Muskego, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 15/734,992

(22) PCT Filed: Jun. 4, 2019

(86) PCT No.: PCT/US2019/035401
§ 371 (c)(1),
(2) Date: Dec. 3, 2020

(87) PCT Pub. No.: WO2019/236589
PCT Pub. Date: Dec. 12, 2019

(65) Prior Publication Data
US 2021/0230032 A1 Jul. 29, 2021

Related U.S. Application Data

(60) Provisional application No. 62/680,764, filed on Jun. 5, 2018.

(51) Int. Cl.
*C02F 3/04* (2006.01)
*C02F 3/08* (2006.01)

(52) U.S. Cl.
CPC ............. *C02F 3/04* (2013.01); *C02F 3/085* (2013.01); *C02F 2209/08* (2013.01); *C02F 2305/02* (2013.01)

(58) Field of Classification Search
CPC ........ C02F 3/04; C02F 3/085; C02F 2209/08; C02F 2305/02; C02F 2301/043;
(Continued)

(56) References Cited

U.S. PATENT DOCUMENTS 3,964,998 A 6/1976 Barnard
4,056,465 A 11/1977 Spector
(Continued)

FOREIGN PATENT DOCUMENTS

WO 2016/148086 A1 9/2016
WO 2017/218605 A1 12/2017

OTHER PUBLICATIONS

Anonymous: "Biological Treatment—Attached-Growth Processes Study Guide", Feb. 1, 2016 (Feb. 1, 2016), XP055884544, [retrieved on Jan. 27, 2022].
(Continued)

*Primary Examiner* — Nam X Nguyen
*Assistant Examiner* — Ekandra S. Miller-Cruz

(57) ABSTRACT

A wastewater treatment system including a contact tank, a dissolved air flotation unit, a fixed film reactor, and a solids-liquid separation unit is disclosed. A method of treating wastewater with a dissolved air flotation unit and a fixed film reactor is also disclosed. A method of retrofitting a fixed film reactor wastewater treatment system including providing a contact tank and a dissolved air flotation unit is also disclosed. A method of facilitating increased operating efficiency of a fixed film wastewater treatment system including providing a dissolved air flotation unit is also disclosed.

19 Claims, 12 Drawing Sheets

(58) Field of Classification Search
CPC ...... C02F 3/006; C02F 2305/12; C02F 3/082; C02F 3/1215; C02F 1/24; C02F 3/121; Y02W 10/10
USPC .......................................................... 210/15
See application file for complete search history.

(56) References Cited

U.S. PATENT DOCUMENTS

| | | | |
|---|---|---|---|
| 4,076,615 | A | 2/1978 | Olesen et al. |
| 5,248,422 | A | 9/1993 | Neu |
| RE40,565 | E * | 11/2008 | Thieblin ................ C02F 1/34 210/627 |
| 2003/0042199 | A1 | 3/2003 | Smith |
| 2003/0192827 | A1 | 10/2003 | McDowell et al. |
| 2010/0163485 | A1 | 7/2010 | Pehrson et al. |
| 2013/0270182 | A1 * | 10/2013 | Tharp .................... C02F 3/109 210/615 |
| 2014/0238932 | A1 | 8/2014 | Erdogan et al. |
| 2015/0210574 | A1 | 7/2015 | Antonneau et al. |
| 2016/0083268 | A1 | 3/2016 | Erdogan et al. |
| 2017/0297940 | A1 * | 10/2017 | Sauvignet ............ B01J 20/3416 |

OTHER PUBLICATIONS

"Extended European Search Report", issued by the European Patent Office regarding related European patent application No. 19816017.8, dated Feb. 9, 2022, 16 pages.

"Communication pursuant to Rules 70(2) and 70a(2) EPC", issued by the European Patent Office regarding related European patent application No. 19816017.8, dated Mar. 1, 2022, 1 page.

Samantaray, Santosh Kumar, "Examination report under sections 12 & 13 of the Patents Act, 1970 and the Patents Rules, 2003", issued for related Indian Patent Application No. 202017048177, dated Jun. 22, 2022, 8 pages.

* cited by examiner

COMBINATION OF CAPTIVATOR AND FIXED FILM BIOREACTOR SOLUTIONS

CROSS-REFERENCE TO RELATED APPLICATIONS

This application claims the benefit under 35 U.S.C. § 119 of U.S. Patent Application No. 62/680,764, titled "Enhancement to Captivator System for Biological Nutrient Removal," filed on Jun. 5, 2018, which is incorporated herein by reference in its entirety for all purposes.

FIELD OF TECHNOLOGY

Aspects and embodiments disclosed herein are directed toward systems and methods for the treatment of wastewater.

SUMMARY

In accordance with an aspect, there is provided a wastewater treatment system. The wastewater treatment system comprises a contact tank having a first inlet fluidly connectable to a source of wastewater to be treated, a second inlet, and an outlet, the contact tank configured to treat the wastewater with waste sludge to form a mixed liquor. The wastewater treatment system may comprise a dissolved air flotation unit having a first inlet fluidly connected to the outlet of the contact tank, a second inlet fluidly connectable to a source of gas, a floated solids outlet, and an effluent outlet, the dissolved air flotation unit configured to treat the mixed liquor with the gas to form floated solids and an effluent. The wastewater treatment system may comprise a fixed film reactor having a first inlet fluidly connected to the effluent outlet of the dissolved air flotation unit, a second inlet, and an outlet, the fixed film reactor configured to form a fixed film effluent and a solid-liquid separation apparatus having an inlet fluidly connected to the outlet of the fixed film reactor, an effluent outlet, and a waste sludge outlet in fluid communication with the second inlet of the contact tank and the second inlet of the fixed film reactor.

In some embodiments, the fixed film reactor is an aerobic biological reactor.

In some embodiments, the fixed film reactor comprises media positioned within an aeration tank.

In some embodiments, the fixed film reactor comprises at least one of a trickling filter, a rotating biological contactor, and a moving bed biological reactor.

In some embodiments, the fixed film reactor comprises a media disk or a panel

In some embodiments, the fixed film reactor comprises randomly packed moving media.

In some embodiments, the wastewater treatment system further comprises a sludge mixing tank having a first inlet fluidly connected to the waste sludge outlet of the solid-liquid separation apparatus and an outlet fluidly connected to the second inlet of the contact tank.

In some embodiments, the wastewater treatment system further comprises the sludge mixing tank having a second inlet fluidly connected to the floated solids outlet of the dissolved air flotation unit.

In some embodiments, the sludge mixing tank has a third inlet fluidly connectable to a source of oxygen.

In some embodiments, the wastewater treatment system further comprises a screen positioned between the source of wastewater and the contact tank In some embodiments, the fixed film effluent comprises about 50 mg/L to about 300 mg/L of biological solids.

In some embodiments, the dissolved air flotation unit effluent has between about 60% to about 70% less TSS than the source of wastewater.

In some embodiments, the fixed film effluent has at least about 20% less BOD than the dissolved air flotation unit effluent.

In accordance with another aspect, there is provided a method for treating wastewater. The method may comprise introducing the wastewater and a waste sludge into a contact tank and mixing the wastewater with the waste sludge in the contact tank to form a mixed liquor. The method may comprise directing at least a portion of the mixed liquor to a dissolved air flotation unit and separating the mixed liquor to form a dissolved air flotation unit effluent and waste biosolids. The method may comprise directing the dissolved air flotation unit effluent to a fixed film reactor and biologically treating the dissolved air flotation unit effluent to form a fixed film effluent. The method may comprise directing the fixed film effluent to a solid-liquid separation apparatus and separating the fixed film effluent to form a solids-lean effluent and the waste sludge. The method may comprise selectively recycling a first portion of the waste sludge to the contact tank and a second portion of the waste sludge to the fixed film reactor. The method may comprise directing the solids-lean effluent to a treated wastewater outlet.

In some embodiments, the method may further comprise recycling at least a portion of the waste biosolids to the contact tank.

In some embodiments, the method may further comprise introducing the waste sludge into a first region of the contact tank and introducing the wastewater into a second region of the contact tank, the first region positioned upstream from the second region.

In some embodiments, the method may further comprise introducing a source of oxygen into the first region of the contact tank.

In some embodiments, the method may further comprise separating non-biological waste solids from the wastewater.

In some embodiments, the method may further comprise introducing at least one of a coagulant, a flocculant, or a ballast material to the fixed film effluent.

In some embodiments, the method may further comprise separating the ballast from the fixed film effluent.

In some embodiments, separating the mixed liquor in the dissolved air flotation unit may comprise reducing TSS by between about 60% and about 70%.

In some embodiments, biologically treating the dissolved air flotation unit effluent may further comprise reducing BOD by at least 20%.

In accordance with another aspect, there is provided a method of retrofitting a wastewater treatment system. The method may comprise providing a contact tank. The method may comprise providing a dissolved air flotation unit. The method may comprise fluidly connecting the contact tank to a source of wastewater. The method may comprise fluidly connecting the contact tank to an inlet of the dissolved air flotation unit. The method may comprise fluidly connecting the dissolved air flotation unit to an inlet of the fixed film reactor. The method may comprise fluidly connecting the contact tank to an outlet of the solid-liquid separation apparatus.

In some embodiments, the method of retrofitting may further comprise providing a sludge mixing tank and fluidly connecting the sludge mixing tank to a source of waste sludge, a source of oxygen, and an inlet of the contact tank.

In some embodiments, the method of retrofitting may further comprise connecting the sludge mixing tank to an outlet of the fixed film reactor.

In some embodiments, the method of retrofitting may further comprise fluidly connecting the sludge mixing tank to an outlet of the solid-liquid separation apparatus.

In some embodiments, the method of providing the contact tank and dissolved air flotation unit may reduce footprint of the wastewater treatment system when replacing a primary treatment subsystem.

In some embodiments, the method of retrofitting may further comprise providing a sensor.

In some embodiments, the method of retrofitting may further comprise providing a controller programmable to instruct a metering valve to selectively direct a first portion of waste sludge from the solid-liquid separation apparatus to the contact tank and a second portion of the waste sludge to the fixed film reactor responsive to a measurement obtained by the sensor and electrically connect the controller to the metering valve.

In accordance with another aspect, there is provided a method of facilitating increased operating efficiency of a wastewater treatment system comprising a fixed film reactor and a solid-liquid separation apparatus. The method may comprise providing a dissolved air flotation unit fluidly connected downstream from a source of wastewater and upstream from the fixed film reactor. The method may comprise instructing a user to operate the dissolved air flotation unit to generate floated biosolids and a dissolved air flotation unit effluent. The method may comprise instructing the user to direct at least a portion of the dissolved air flotation unit effluent to the fixed film reactor. The method may comprise instructing the user to selectively direct a first portion of waste sludge of the solid-liquid separation apparatus to the contact tank and a second portion of the waste sludge to the fixed film reactor.

In some embodiments, the method of facilitating increased operating efficiency of a wastewater treatment system may further comprise providing a contact tank fluidly connected to the source of wastewater and upstream from the dissolved air flotation unit.

In some embodiments, the method of facilitating increased operating efficiency of a wastewater treatment system may further comprise instructing the user to direct at least a portion of the floated biosolids to the contact tank.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
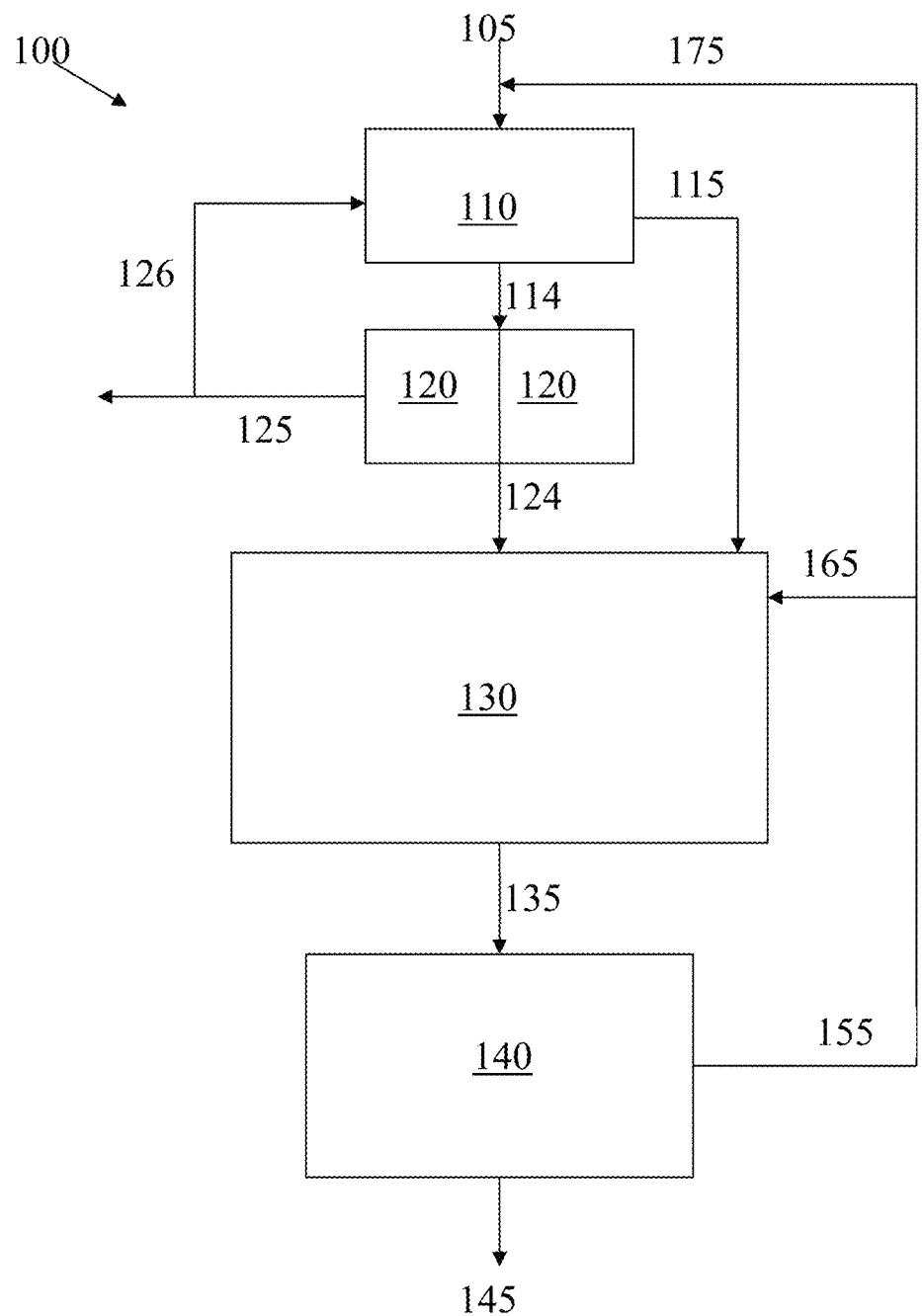
FIG. 1 is a block flow diagram of a wastewater treatment system in accordance with an embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

As the term is used herein, an "upstream" unit operation refers to a first unit operation which is performed upon a fluid undergoing treatment prior to a second unit operation. Similarly, an "upstream" treatment vessel or portion thereof refers to a first treatment vessel or portion thereof in which a first unit operation is performed prior to a second unit operation performed in a second treatment vessel or portion thereof. A "downstream" unit operation refers to a second unit operation which is performed upon a fluid undergoing treatment subsequent to a first unit operation. Similarly, a "downstream" treatment vessel or portion thereof refers to a second treatment vessel or portion thereof in which a second unit operation is performed subsequent to a first unit operation performed in a first treatment vessel or portion thereof. An upstream unit operation and/or treatment vessel having an outlet in "direct fluid communication" with an inlet of a downstream unit operation and/or treatment vessel directs material output from the outlet of the upstream unit operation and/or treatment vessel into the inlet of the downstream unit operation and/or treatment vessel without any intervening operations performed on the material. A first unit operation and/or treatment vessel described herein as being in fluid communication with a second unit operation and/or treatment vessel should be understood as being in direct fluid communication with the second unit operation and/or treatment vessel unless explicitly described as otherwise. Conduits which provide fluid communication between a first and a second unit operation and/or treatment vessel are to be understood as providing direct fluid communication between the first and second unit operation and/or treatment vessel unless explicitly described as otherwise.

Various unit operations and/or treatment vessels disclosed herein separate fluid and/or sludge into a solids-rich portion and a solids-lean portion wherein the solid-lean portion has a lower concentration of solids than the solids-rich portion. As the term is used herein, an "effluent" of a unit operation and/or treatment vessel refers to the solids-lean portion of the separated fluid and/or sludge. "Recycle" of material refers to directing material from an outlet of a downstream unit operation and/or treatment vessel to an inlet of a unit operation and/or treatment vessel upstream of the downstream unit operation and/or treatment vessel.

U.S. Pat. Nos. 8,808,544 and 10,131,550, titled "Contact Stabilization/Prime Float Hybrid" and "Enhanced Biosorption of Wastewater Organics Using Dissolved Air Flotation with Solids Recycle," respectively, are incorporated herein by reference in their entireties for all purposes.

Aspects and embodiments of the present invention are directed toward systems and methods for treating wastewater. As used herein the term "wastewater" includes, for example, municipal wastewater, industrial wastewater, agricultural wastewater, and any other form of liquid to be treated containing undesired contaminants. Aspects and embodiments of the present invention may be utilized for primary wastewater treatment, secondary wastewater treatment, or both. Aspects and embodiments of the present invention may remove sufficient contaminants from wastewater to produce product water that may be used for, for example, irrigation water, potable water, cooling water, boiler tank water, or for other purposes.

In some embodiments, the apparatus and methods disclosed herein provide advantages with regard to, for example, capital costs, operational costs, and environmental-friendliness as compared to conventional fixed film wastewater treatment systems. In some embodiments a dissolved air flotation system is included in a main stream of wastewater entering a fixed film wastewater treatment system. The dissolved air floatation system may remove a significant amount of biological oxygen demand, for example, particulate biological oxygen demand, from wastewater prior to the wastewater entering the fixed film treatment portion of the wastewater treatment system, increasing operating efficiency of the fixed film treatment system. This provides for a reduction in the size of the primary treatment portion of the wastewater treatment system for a given wastewater stream as compared to a conventional fixed film wastewater treatment system and a commensurate reduced capital cost for the overall system. Utilization of the dissolved air flotation system may also reduce the requirement for aeration in the fixed film treatment portion of the treatment system to effect oxidation of the biological oxygen demand of the wastewater, reducing operating costs. The amount of waste sludge generated by the fixed film treatment portion of the treatment system may also be reduced, reducing the amount of waste which would need to be disposed of or otherwise further treated. The material removed from the wastewater in the dissolved air flotation system may be utilized to produce energy, for example, in the form of biogas in a downstream anaerobic digestion system. The biogas may be used to provide salable energy through combustion or through use in, for example, fuel cells.

In accordance with an embodiment there is provided a method of facilitating increased operating efficiency of a wastewater treatment system. The method comprises configuring a dissolved air flotation (DAF) unit in a wastewater treatment system in fluid communication between a contact tank and a fixed film reactor to remove solids from a portion of a first mixed liquor output from the contact tank prior to the portion of the first mixed liquor entering the fixed film reactor and to recycle at least a portion of the solids to the contact tank, the recycle of the at least a portion of the solids to the contact tank reducing an amount of biological oxygen demand to be treated in the fixed film reactor as compared to the wastewater treatment system operating in the absence of recycling the at least a portion of the solids to the contact tank.

In some embodiments, greater than 50% of the solids are recycled from the DAF unit to the contact tank.

In some embodiments, the wastewater treatment system comprises a combination of the DAF unit and the contact tank, which can result in a reduced size of a treatment system due to a reduced biochemical oxygen demand (BOD) load. A reduced BOD load may allow for a higher energy production in a waste sludge anaerobic digester and reduce the aeration requirements in the system.

As the term is used herein, an "aerobic digester" and an "anaerobic digester" can operate as shown in U.S. Pat. Nos. 8,808,544 and 10,131,550, titled "Contact Stabilization/Prime Float Hybrid" and "Enhanced Biosorption of Wastewater Organics Using Dissolved Air Flotation with Solids Recycle," herein incorporated by reference in their entirety for all purposes.

In some embodiments, the method comprises recycling solids from the DAF unit to the contact tank in an amount sufficient to increase biogas production of an anaerobic digester of the wastewater treatment system having an inlet in fluid communication with an outlet of the DAF unit, at least a second portion of the solids removed in the DAF unit being directed into the anaerobic digester.

In some embodiments, the method comprises recycling solids from the DAF unit to the contact tank in an amount sufficient to reduce the energy consumption of the wastewater treatment system.

In accordance with an embodiment there is provided a wastewater treatment system. The wastewater treatment system comprises a contact tank having a first inlet, a second inlet, and an outlet and a dissolved air flotation tank having an inlet in fluid communication with the outlet of the contact tank, a first outlet, and a second outlet. The wastewater treatment system further comprises a fixed film reactor having a first inlet in fluid communication with the outlet of the dissolved air flotation tank, a second inlet, and an outlet. The wastewater treatment system further comprises a solid-liquid separation apparatus having an inlet in fluid communication with the outlet of the fixed film reactor, an outlet in fluid communication with the second inlet of the contact tank and with the second inlet of the fixed film reactor.

A fixed film biological system may oxidize and reduce soluble substrate, eliminating impurities and producing solids. Fixed film processes may maintain biological growth on a surface or inert carrier or sheet. The fixed film treated effluent may contain about 100 milligrams per liter (mg/l) to about 200 mg/l of biological solids for a typical wastewater. In general, the amount of biological solids in the fixed film effluent is dependent on influent TSS and BOD. Examples of fixed film processes include, without limitation, moving bed bioreactors (MBBR's), trickling filters, and rotating biological contactors. In a conventional fixed film system, wastewater is filtered through a primary or coarse screen and treated in a primary clarification unit. Effluent of these primary processes or a raw wastewater may enter a fixed film biological system where soluble substrate is oxidized or reduced to biological solids in the form of slough from the fixed biomass on the inert carrier or sheet of the fixed film reactor. Aeration may be supplied in aerobic zones to supply oxygen and mixing to the system. Oxygen may be supplied directly from the atmosphere. Thus, in certain embodiments, the fixed film reactor is substantially free of an active aeration system.

In a fixed film system, generally, excess biomass sloughs off the media and is removed in a secondary clarifier. The sludge that is collected on the bottom of the clarifier may be pumped out of the clarifier and disposed of as waste sludge.

Unlike an activated sludge system, there typically is no return of the bottom clarifier sludge to the fixed film system. There may be no need to recycle waste sludge back to the fixed film system because the required amount of biomass is retained on the media. In anaerobic or anoxic based systems, mixers may be provided to maintain mixing throughout.

In accordance with certain embodiments, a fixed film system may be retrofitted by installing a dissolved air flotation unit and contact tank upstream from the fixed film reactor. The dissolved air flotation unit and contact tank may reduce footprint of the fixed film treatment system when replacing a primary clarifier. In some embodiments, the dissolved air flotation unit and contact tank may reduce footprint of the primary treatment by at least about 50%. The dissolved air flotation unit and contact tank may reduce footprint of the primary treatment by at least about 55%, about 60%, about 65%, or about 70%.

In other embodiments, an existing primary clarifier can be repurposed as a dissolved air flotation unit to increase operating capacity of the treatment system. Retrofitting an existing primary clarifier into a dissolved air flotation unit may increase operating capacity by at least about five fold. In some embodiments, retrofitting the existing primary clarifier into a dissolved air flotation unit may increase operating capacity by at least about 100%, about 200%, about 300%, about 400%, about 500%, about 600%, or about 700%. In certain embodiments, retrofitting the existing primary clarifier into a dissolved air flotation unit may increase operating capacity at least 2 fold, at least 5 fold, at least 7 fold, or at least 10 fold. In an exemplary embodiment, a primary clarifier is operated at about 1000 gpd/ft$^2$ and a dissolved air flotation unit is operated at about 5000 gpd/ft$^2$. Repurposing the same exemplary tank to be used as a dissolved air flotation unit will increase operating capacity by a factor of five.

Furthermore, because the solids are floated instead of settled, a dissolved air flotation primary treatment may remove a high degree of fats, oils, and grease (FOG) from the wastewater, reducing the load on the fixed film reactor. In some embodiments, primary treatment with the dissolved air flotation unit may reduce a load of FOG on the fixed film reactor by at least about 60% as compared to a primary clarifier. Retrofitting a fixed film wastewater treatment system with a dissolved air flotation unit may reduce a load of FOG on the fixed film reactor by at least about 60%, about 70%, about 80%, or about 90%.

The systems and methods of the present disclosure may be particularly advantageous, for example, in treatment plants where a small footprint is required such as, for example, a retrofit for industrial plants, small flow plants or package plants, hybrid wastewater plants, combining fixed film processes and activated sludge processes, and lagoon plants requiring nitrification. Also, this combination may be used in small flow systems that do not have significant operator interface yet require a high quality effluent. The use of a fixed film process in combination with a dissolved air flotation unit is not limited to the examples given. Many uses in biological and chemical treatment of wastewater or potable water are possible.

The use of a dissolved air flotation system may benefit the existing fixed film system by removing a high percentage of particulate (suspended) BOD and lesser amount of soluble BOD. The retrofit generally reduces the size of the treatment system due to reduced BOD load, allows for higher energy production in a waste sludge anaerobic digester, and reduces aeration requirements. In general, the fixed film system does not operate with activated sludge. Instead, the dissolved air flotation system may use waste sludge from the fixed film system to adsorb soluble and particulate BOD in raw wastewater. Pilot testing (described in more detail below) with fixed film waste sludge shows similar removal of particulate and soluble BOD, as compared to activated sludge treatment.

The fixed film biological system may provide an effluent comprising biological solids, often referred to as slough, which requires separation from a treated effluent in a downstream process. While fixed film processes have a small footprint, effluent biological solids from the process are often difficult to settle with conventional sedimentation processes frequently requiring a large settling area. Downstream clarification, therefore, is often the limiting step in the rate of wastewater treatment involving fixed film biological systems or fixed film reactors.

In accordance with some aspects of the method of treating wastewater, the DAF unit removes between about 60% and about 100% of suspended solids in the wastewater. For example, the DAF unit may remove at least about 60%, about 70%, about 80%, about 90%, or about 99% of the suspended solids in the wastewater. By providing primary treatment with a DAF unit, the load of suspended solids on the fixed film reactor may be reduced, as compared to primary treatment with a clarifier.

Similarly, in accordance with some aspects of the method of treating wastewater, the DAF unit removes between about 20% and about 80% of biological oxygen demand in the wastewater. For example, the DAF unit may remove at least about 20%, about 30%, about 40%, about 50%, about 60%, about 70%, or about 80% of BOD in the wastewater. By providing primary treatment with a DAF unit, the load of BOD on the fixed film reactor may be reduced, as compared to primary treatment with a clarifier.

According to certain embodiments, the systems and methods may include a ballasted solids-liquid separation downstream from the fixed film reactor. Ballasted flocculation systems or ballasted settling systems may comprise the addition of a coagulant, ballast, and, optionally, flocculant to improve the removal of dissolved, colloidal, particulate and microbiological solids. The precipitation and enhanced settlability of ballasted solids provides for a small clarification step, which may allow for a small footprint system comprising biological and clarification steps. According to embodiments of the present disclosure, ballasted flocculation systems may eliminate the need to provide a secondary clarifier directly downstream of a fixed film biological system or reactor.

Flocculation may be a process of contact and adhesion whereby particles and colloids in liquid such as a water or wastewater form larger-size clusters of material. Particles may cluster together into a floc. A flocculant may comprise a material or a chemical that promotes flocculation by causing colloids and particles or other suspended particles in liquids to aggregate, forming a floc. Polymer may be used as flocculants. For example, acrylic acid/acrylamide copolymers and modified polyacrylamides may be used.

Coagulation may be a process of consolidating particles, such as suspended solids. Coagulants may include cations, such as multivalent cations. They may include cations such as aluminum, iron, calcium or magnesium (positively charged molecules) that may interact with negatively charged particles and molecules that reduce the barriers to aggregation. Examples of coagulants include bentonite clay, polyaluminum chloride, polyaluminum hydroxychloride, aluminum chloride, aluminum chlorohydrate, aluminum sulfate, ferric chloride, and ferrous sulfate monohydrate.

In certain embodiments, a fixed film process followed by a ballasted flocculation process may be utilized for biological treatment of water or wastewater to remove at least one of nitrogen compounds, such as nitrates, biological oxygen demand (BOD), chemical oxygen demand (COD), and phosphorus compounds. Fixed film processes may reduce nitrate to nitrogen gas. Biological solids produced may then be removed in addition to dissolved, colloidal and particulate solids by the ballasted clarifiers. In certain embodiments, at least one of nitrogen compounds, such as nitrates, biological oxygen demand (BOD), chemical oxygen demand (COD), and phosphorus compounds may be removed prior to disinfection to provide potable water or drinking water to distribute it to a water supply grid.

In some embodiments, the fixed film reactor comprises media positioned within an aeration tank. The fixed film reactor may comprise at least one of a stationary or moving structure. For example, the fixed film reactor may comprise a stationary or moving structure as included in a trickling filter, a rotating biological contactor, or a moving bed biological reactor. The fixed film reactor may comprise a media disk or a panel to retain biomass as a film. The media disk may be, for example, a rotating disk. The fixed film reactor may comprise randomly packed moving media. The media may comprise, for example, one or more of plastic, sand, wood, rocks, or fabric. Exemplary plastic media comprises polymers. In certain embodiments, the media may include plasticizers as an additive. Exemplary media includes polyethylene, polyvinyl chloride, or polypropylene.

A first embodiment, indicated generally at 100, is illustrated in FIG. 1. Wastewater from a source of wastewater 105 is directed into a contact tank 110 through an inlet of the contact tank. In the contact tank 110, the wastewater is mixed with waste sludge recycled through a conduit 175 from a downstream fixed film reactor described below. In some embodiments, the contact tank 110 is aerated to facilitate mixing of the wastewater and the waste sludge. The aeration gas may be an oxygen containing gas, for example, air. The contact tank 110 may be provided with sufficient oxygen such that aerobic conditions are maintained in at least a portion of the contact tank 110. For example, the contact tank 110 may be aerated. In other embodiments, the contact tank 110 may not be aerated. Suspended and dissolved solids in the wastewater, including oxidizable biological materials (referred to herein as Biological Oxygen Demand, or BOD), are adsorbed/absorbed into the waste sludge in the contact tank, forming a first mixed liquor. A portion of the BOD may also be oxidized in the contact tank 110. The residence time of the wastewater in the contact tank may be sufficient for the majority of the BOD to be adsorbed/absorbed by the waste sludge, but not so long as for a significant amount of oxidation of the BOD to occur. In some embodiments, for example, less than about 10% of the BOD entering the contact tank 110 is oxidized in the contact tank. The residence time of the wastewater in the contact tank is in some embodiments from about 30 minutes to about two hours, and in some embodiments, from about 45 minutes to about one hour. The residence time may be adjusted depending upon factors such as the BOD of the influent wastewater. A wastewater with a higher BOD may require longer treatment in the contact tank 110 than wastewater with a lower BOD.

A first portion of the first mixed liquor formed in the contact tank is directed into a dissolved air flotation (DAF) system 120 through conduit 114. The DAF system may include a vessel, tank, or other open or closed containment unit configured to perform a dissolved air flotation operation as described below. For the sake of simplicity a dissolved air flotation system will be referred to herein as a "DAF unit." The DAF unit 120 may function as both a thickener and a clarifier. FIG. 1 illustrates two DAF units 120 operating in parallel, however, other embodiments may have a single DAF unit or more than two DAF units. Providing multiple DAF units provides for the system to continue operation if one of the DAF units is taken out of service for cleaning or maintenance.

Before entering the DAF unit(s), air or another gas may be dissolved in the first mixed liquor under pressure. The pressure may be released as the first mixed liquor enters the DAF unit(s) 120, resulting in the gas coming out of solution and creating bubbles in the mixed liquor. In some embodiments, instead of dissolving gas into the first mixed liquor, a fluid, for example, water having a gas, for example, air, dissolved therein, is introduced into the DAF unit(s) 120 with the first mixed liquor. Upon the mixing of the first mixed liquor and the gas-containing fluid, bubbles are produced. The bubbles formed in the DAF unit(s) 120 adhere to suspended matter in the first mixed liquor, causing the suspended matter to float to the surface of the liquid in the DAF unit(s) 120, where it may be removed by, for example, a skimmer.

In some embodiments, the first mixed liquor is dosed with a coagulant, for example, ferric chloride or aluminum sulfate prior to or after introduction into the DAF unit(s) 120. The coagulant facilitates flocculation of suspended matter in the first mixed liquor.

In the DAF unit(s) 120 at least a portion of the solids present in the influent first mixed liquor, including solids from the influent wastewater and from the waste sludge, are removed by a dissolved air flotation process. At least a portion of any oil that may be present in the first mixed liquor may also be removed in the DAF unit(s) 120. In some embodiments, a majority, for example, about 60% or more, about 75% or more, or about 90% or more of the suspended solids in the first mixed liquor introduced into the DAF unit(s) 120 is removed and about 40% or more, for example, about 50% or more or about 75% or more of the BOD is removed. Removal of the BOD may include enmeshment and adsorption in the first mixed liquor and/or oxidation of the BOD and the formation of reaction products such as carbon dioxide and water. In other embodiments, up to about 100% of the suspended solids is removed in the DAF unit(s) 120 and a majority, for example, up to about 80% of the BOD is removed.

In some embodiments, suspended solids removed in the DAF unit(s) 120 are sent out of the system as waste solids through a conduit 125. These waste solids may be disposed of, or in some embodiments, may be treated in a downstream process, for example, an anaerobic digestion process or anaerobic membrane bioreactor to produce useful products, for example, biogas and/or usable product water.

In other embodiments, at least a portion of the suspended solids removed in the DAF unit(s) 120 are recycled back to the contact tank 110 through conduits 125 and 126. Conduit 126 may branch off of conduit 125 as illustrated, or may be connected to a third outlet of the DAF unit(s) 120, in which case suspended solids removed in the DAF unit(s) 120 are recycled back to the contact tank 110 through conduit 126 only. The amount of solids recycled from DAF unit(s) 120 to the contact tank 110 may range from about 1% to about 100% of a total amount of solids removed from the first mixed liquor in the DAF unit(s) 120. The amount of solids recycled from DAF unit(s) 120 to the contact tank 110 may be a majority of a total amount of solids removed from the first mixed liquor in the DAF unit(s) 120, for example, greater than about 50%, between about 50% and about 95%, or between about 60% and about 80% of the total amount of solids removed from the first mixed liquor in the DAF unit(s) 120.

Recycling solids removed in the DAF unit(s) 120 to the contact tank 110 is counter to the conventional operation of wastewater treatment systems including DAF units. Typically, DAF units are utilized in wastewater treatment systems to remove solids from the wastewater, thus reducing the need for biological treatment of these removed solids and reducing the energy requirements of the wastewater treatment system by, for example, reducing the amount of air needed to be supplied to an aerated biological treatment vessel to oxidize the removed solids. It is counter to conventional operation of wastewater treatment systems to re-introduce floated solids separated from mixed liquor from a contact tank in DAF unit(s) back to the contact tank. Typically, after solids are separated from mixed liquor from a contact tank in DAF unit(s), reintroducing the separated solids into mixed liquor in the contact tank and forcing the solids to go through the same separation process in the DAF unit(s) would reduce the efficiency of the system. Such a solids recycle from DAF unit(s) to a contact tank directly upstream of the DAF unit(s) would cause a need for a greater amount of contact tank capacity and a greater amount of DAF unit capacity. Such a solids recycle from DAF unit(s) to a contact tank directly upstream of the DAF unit(s) would also require more air flow to the DAF unit(s) to remove the recycled solids from the mixed liquor in addition to any solids that would be present in the absence of the solids recycle. It has been discovered, however, that benefits may be achieved by the counterintuitive re-introduction of solids removed in DAF unit(s) back into the contact tank of a wastewater treatment system from which mixed liquor is supplied to the DAF unit(s).

For example, by recycling the solids removed by the DAF unit(s) 120 to the contact tank 110, the amount of total suspended solids (TSS) in the contact tank 110 may be increased as compared to methods not including a recycle of solids from the DAF unit(s) 120 to the contact tank 110. The increased TSS level in the contact tank 110 may provide for additional soluble BOD to be adsorbed in the contact tank 110 as compared to a contact tank 110 having a lower level of TSS. In some embodiments, a desirable TSS level in the contact tank 110 may be between about 1,200 mg/L and about 3,500 mg/L.

The removal of the additional soluble BOD in the contact tank 110 due to the higher TSS level in the contact tank 110, resulting from the recycle of solids from the DAF unit(s) 120 to the contact tank 110, provides for the removal of this additional BOD as solids in the DAF unit(s) 120. The additional BOD removed as solids in the DAF unit(s) 120 may be directed to an anaerobic digester (for example, anaerobic digester 490 illustrated in FIG. 3) rather than an aerated fixed film reactor (for example, fixed film reactor 130), thus reducing the need for aeration power in the fixed film reactor and increasing the amount of biogas that could be produced in the anaerobic digester.

When supplied with recycled solids from the DAF unit(s) 120, the contact tank 110 may have a hydraulic retention time (HRT) of between about 15 minutes and about one hour and a solids retention time (SRT) of between about 0.5 days and about two days to effectively adsorb soluble BOD. In other embodiments, the SRT in the contact tank may be between about 0.2 and about 0.4 days. When the contact tank 110 includes TSS in a range of between about 1,200 mg/L and about 3,500 mg/L, a sludge age (SRT) in the contact tank may range from about one to about two days.

Recycling solids removed in the DAF unit(s) 120 to the contact tank 110 provides for the contact tank 110 to function as a high rate waste sludge system while the DAF unit(s) 120 function a solids-liquid separator. Recycling solids removed in the DAF unit(s) 120 to the contact tank 110 provides for greater oxidation of BOD in the contact tank 110 than in systems where solids removed from the DAF unit(s) 120 are not recycled to the contact tank because the solids recycled to the contact tank includes living bacteria capable of oxidizing BOD. For example, in systems and methods where solids removed in the DAF unit(s) 120 are recycled to the contact tank 110, oxidation of greater than about 10% of the BOD in wastewater influent to the contact tank 110 may be oxidized in the contact tank 110. Recycling solids removed in the DAF unit(s) 120 to the contact tank 110 may thus reduce the amount of BOD that needs to be treated in downstream unit operations, for example, in the fixed film reactor 130 discussed below, thus reducing the power requirements for the downstream unit operations. The SRT of the contact tank 110 may be adjusted to optimize BOD removal of particulate, colloidal, and soluble BOD fractions.

Effluent from the DAF unit(s) 120 is directed through conduit 124 into the fixed film reactor 130, which may include one or more treatment tanks. In some embodiments, the fixed film reactor 130 may comprise a contact stabilization vessel. A portion of the effluent may be recycled (recycle system not shown in FIG. 1) to supply gas bubbles to the DAF unit(s) 120. A gas may be dissolved into the recycled portion of effluent, which is then directed back into the DAF unit(s) 120 and mixed with influent first mixed liquor.

In certain embodiments, a second portion of the first mixed liquor formed in the contact tank may be directed into the fixed film reactor 130 through a conduit 115. In some embodiments, about a half of the first mixed liquor formed in the contact tank is directed into the DAF unit(s) 120 and about a half of the first mixed liquor formed in the contact tank is directed through the conduit 115 into the fixed film reactor 130. In other embodiments, between about one third and two thirds of the first mixed liquor formed in the contact tank is directed into the DAF unit(s) 120 and the remainder of the first mixed liquor formed in the contact tank is directed through the conduit 115 into the fixed film reactor 130. The amount of the first mixed liquor directed into the DAF unit(s) 120 as opposed to the fixed film reactor 130 may be varied based upon such factors as the concentration of the first mixed liquor and the effectiveness of the first mixed liquor at enmeshing BOD in the contact tank 110.

For example, if it was desired to remove a greater rather than a lesser amount of solids in the DAF unit(s) 120, a greater fraction of the first mixed liquor from the contact tank would be directed to the DAF unit(s) 120 when the first mixed liquor had a lower rather than a higher concentration of solids. Similarly, if it was desired to remove a greater rather than a lesser amount of BOD in the DAF unit(s) 120, a greater fraction of the first mixed liquor from the contact tank would be directed to the DAF unit(s) 120 when the first mixed liquor had a lesser rather than a greater effectiveness at enmeshing BOD in the contact tank.

In the fixed film reactor 130, the effluent from the DAF unit(s) 120 and the first mixed liquor formed in the contact tank 110 are combined to form a second mixed liquor which is biologically treated. The fixed film reactor may comprise media, optionally fixed to a surface such as a rotating wheel or sheet, to maintain biological growth on an inert carrier. In some embodiments, biological treatment of the second mixed liquor in the fixed film reactor 130 includes oxidation of BOD in the second mixed liquor. To this end, oxygen may be supplied to the second mixed liquor in the fixed film reactor 130 by aeration with an oxygen containing gas, for example, air. In some embodiments, the fixed film reactor 130 is supplied with sufficient oxygen for aerobic conditions to be created in the biological treatment unit 130. In other embodiments, the amount of oxygen supplied is insufficient to meet the entire oxygen demand of the second mixed liquor, and the biological treatment unit 130, or at least a portion thereof, may be maintained in an anoxic or anaerobic condition. The residence time of the second mixed liquor in the fixed film reactor 130 may be sufficient to oxidize substantially all BOD in the second mixed liquor. Residence time for the second mixed liquid in the fixed film reactor 130 may be from about three to about eight hours. This residence time may be increased if the influent wastewater to be treated and/or the second mixed liquor contains a high level of BOD or decreased if the influent wastewater to be treated and/or the second mixed liquor includes a low level of BOD.

Fixed film reactor effluent from the fixed film reactor 130 is directed through a conduit 135 into a separation apparatus, which may include, for example, a solid-liquid separation apparatus 140 (a clarifier, a gravity separation apparatus, and/or another form of separation apparatus). Effluent from the solid-liquid separation apparatus 140 may be directed to a product water outlet through a conduit 145 or be sent on for further treatment. Waste sludge separated from effluent in the solid-liquid separation apparatus may be recycled back upstream to a wastewater inlet of the system, the source of wastewater, the contact tank 110 through conduits 155 and 175, and/or the fixed film reactor 130 through conduits 155 and 165. In some embodiments 100% of the waste sludge separated in the solid-liquid separation apparatus is recycled upstream. In some embodiments between about 10% and about 20% of the recycled sludge is directed to the wastewater inlet and contact tank through the conduit 175 and between about 80% and 90% of the recycled sludge is directed into the fixed film reactor 130 through the conduit 165. The amount of recycled sludge directed to the wastewater inlet and contact tank through the conduit 175 may be set at a higher end of this range when the incoming wastewater has a high level of BOD and/or when the recycled sludge is less rather than more effective at enmeshing BOD in the contact tank 110. The amount of recycled sludge directed to the wastewater inlet and contact tank through the conduit 175 may be set at a lower end of this range when the incoming wastewater has a low level of BOD and/or when the recycled sludge is more rather than less effective at enmeshing BOD in the contact tank 110.

The amount of waste sludge separated in the solid-liquid separation apparatus 140 which is recycled to the contact tank 110 and/or fixed film reactor 130 may also be adjusted based on a fraction of the first mixed liquor from the contact tank 110 which is directed to the DAF unit(s) 120, the amount of waste sludge which is removed in the DAF units(s) 120, and/or the amount of waste sludge removed in the DAF units(s) 120 which is recycled to the contact tank 110. The amount of waste sludge which is recycled to the contact tank 110 and/or fixed film reactor 130 may be an amount equal to or greater than an amount required to maintain a desired population of bacteria in the fixed film reactor 130 to perform biological treatment of the second mixed liquor within a desired timeframe and/or to protect against depletion of the bacterial population in the event of temporary disruptions in the operation of the treatment system. For example, the amounts of waste sludge which is recycled to the contact tank 110 or fixed film reactor 130 may be set such that sufficient bacteria containing solids are present in the fixed film reactor 130 to result in a SRT of between about one and about 10 days in the fixed film reactor 130. Similarly, an amount or fraction of the first mixed liquor directed into the DAF unit(s) 120 may be adjusted based on the amount of waste sludge recycled from the solid-liquid separation apparatus 140, the efficiency of removal of solids in the DAF unit(s) 120 and/or the concentration of one or more types of bacteria in the fixed film reactor 130 to, for example, establish or maintain a desired population of bacteria in the fixed film reactor 130.

In the embodiment illustrated in FIG. 1, and in the additional embodiments described below, it should be understood that the various conduits illustrated may be provided with, for example, pumps, valves, sensors, and control systems as needed to control the flow of fluids therethrough. These control elements are not illustrated in the figures for the sake of simplicity.

Figure 2:
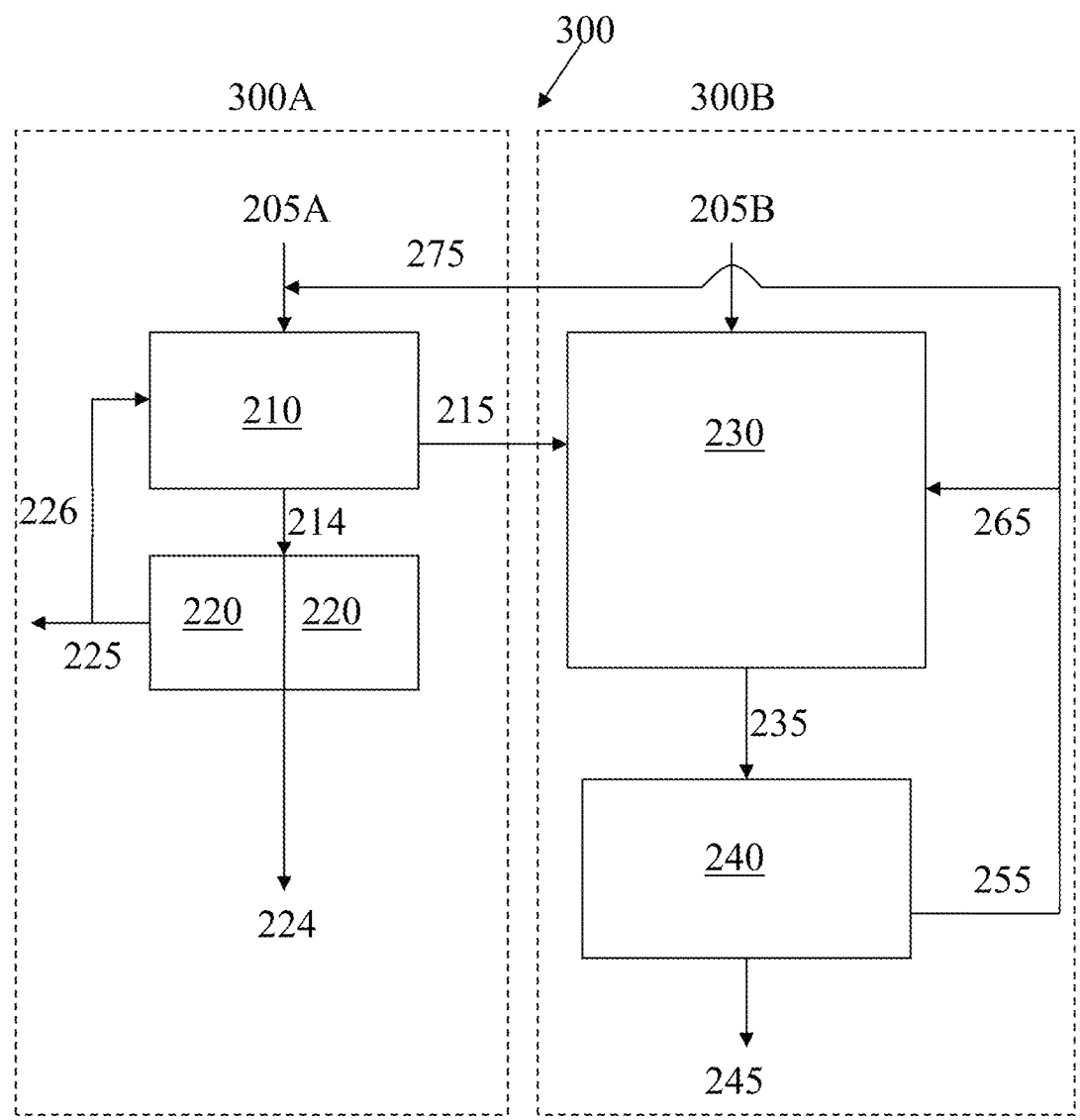
FIG. 2 is a block flow diagram of a wastewater treatment system in accordance with another embodiment.

Another embodiment, indicated generally at 300, is illustrated in FIG. 2. In this embodiment, the wastewater treatment system 300 is broken into two separate but interconnected subsystems, one subsystem 300A including a contact tank 210 and DAF unit(s) 220, and a second subsystem 300B including a fixed film reactor 230 and a separation apparatus 240. In the first subsystem 300A influent wastewater from a source of wastewater 205A is directed into the contact tank 210. In the contact tank, the wastewater is mixed with waste sludge recycled through a conduit 275 from a biological treatment process included in subsystem 300B described below. In some embodiments, the contact tank 210 is aerated to facilitate mixing of the wastewater and the waste sludge. Suspended and dissolved solids in the wastewater are adsorbed/absorbed into the waste sludge in the contact tank 210, forming a first mixed liquor. A portion of the BOD in the influent wastewater may be oxidized in the contact tank 210. The residence time of the wastewater in the contact tank may be sufficient for the majority of the BOD to be adsorbed/absorbed by the waste sludge, but no so long as for a significant amount of oxidation of the BOD to occur. In some embodiments, for example, less than about 10% of the BOD entering the contact tank 210 is oxidized in the contact tank. The residence time of the wastewater in the contact tank is in some embodiments from about 30 minutes to about two hours, and in some embodiments, from about 45 minutes to about one hour. The residence time may be adjusted depending upon factors such as the BOD of the influent wastewater. A wastewater with a higher BOD may require longer treatment in the contact tank 210 than wastewater with a lower BOD.

A first portion of the first mixed liquor formed in the contact tank is directed into a DAF unit 220 through conduit 214. FIG. 2 illustrated two DAF units 220 operating in parallel, however other embodiments may have a single DAF unit or more than two DAF units. Providing multiple DAF units provides for the system to continue operation if one of the DAF units is taken out of service for cleaning or maintenance. A second portion of the first mixed liquor formed in the contact tank is directed into the fixed film reactor 230 in the second subsystem 300B through a conduit 215. In some embodiments, about a half of the first mixed liquor formed in the contact tank is directed into the DAF unit(s) 220 and about a half of the first mixed liquor formed in the contact tank is directed through the conduit 215 into the fixed film reactor 230. In other embodiments, between about one third and two thirds of the first mixed liquor formed in the contact tank is directed into the DAF unit(s) 220 and the remainder of the first mixed liquor formed in the contact tank is directed through the conduit 215 into the fixed film reactor 230. The amount of the first mixed liquor directed into the DAF unit(s) 220 as opposed to the fixed film reactor 230 may be varied based upon such factors as the concentration of the first mixed liquor and the effectiveness of the first mixed liquor at enmeshing BOD in the contact tank 210.

In the DAF unit(s) 220 at least a portion of the solids present in the influent first mixed liquor, including solids from the influent wastewater and from the recycled waste sludge, are removed by a dissolved air flotation process such as that described above with reference to DAF unit(s) 120. The removed suspended solids may be sent out of the system as waste solids through a waste conduit 225. These waste solids may be disposed of or treated in a downstream process, for example, an anaerobic digestion process or anaerobic membrane bioreactor to produce biogas and/or usable product water. Effluent from the DAF unit(s) 220 is directed to an outlet 224 from which it may be used as product water or sent on for further treatment.

In some embodiments, a portion of the suspended solids removed from the first mixed liquor in the DAF unit(s) 220 may be recycled to the contact tank 210 through conduits 225 and 226 in a similar manner as the recycle of suspended solids removed in the DAF unit(s) 120 to the contact tank 110 described above with reference to FIG. 1.

In the second subsystem 300B, influent wastewater from a source of wastewater 205B is introduced into the fixed film reactor 230. The source of wastewater 205B may be the same as or different from the source of wastewater 205A. In the fixed film reactor 230 the wastewater and the first mixed liquor formed in the contact tank 210 are combined to form a second mixed liquor which is biologically treated. In some embodiments, biological treatment of the second mixed liquor in the fixed film reactor 230 may include oxidation of BOD in the second mixed liquor. To this end, oxygen may be supplied to the second mixed liquor in the fixed film reactor 230 by aeration with an oxygen containing gas, for example, air. In some embodiments, the fixed film reactor 230 is supplied with sufficient oxygen for aerobic conditions to be created in the fixed film reactor 230. In other embodiments, the amount of oxygen supplied is insufficient to meet the entire oxygen demand of the second mixed liquor and the fixed film reactor 230, or at least a portion thereof, may be maintained in an anoxic or anaerobic condition.

Residence time for the second mixed liquid in the fixed film treatment tank 230 may be from about three to about eight hours. This residence time may be increased if the influent wastewater to be treated and/or the second mixed liquor contains a high level of BOD or decreased if the wastewater and/or the second mixed liquor includes a low level of BOD.

Fixed film effluent from the fixed film reactor 230 is directed through a conduit 235 into a separation apparatus 240, which may include, for example, a clarifier. Effluent from the solid-liquid separation apparatus 240 may be directed to a product water outlet through a conduit 245 or be sent on for further treatment. Waste sludge separated from effluent in the solid-liquid separation apparatus may be recycled back upstream to the fixed film reactor 230 and/or to the contact tank 210 in subsystem 300A through a conduit 255. In some embodiments about 100% of the waste sludge separated in the solid-liquid separation apparatus is recycled upstream. In some embodiments from about 10% to about 20% of the recycled sludge is directed to the wastewater inlet and contact tank through a conduit 275 and from about 80% to about 90% of the recycled sludge is directed into the fixed film reactor 230 through a conduit 265.

Utilizing DAF units as described above in a wastewater treatment system provides several advantages over similar wastewater treatment systems operated without DAF units. Because the DAF units remove a significant portion of suspended solids from influent wastewater without the need for oxidation of these solids, the size of other components of the system may be reduced, resulting in a lower capital cost for the system. For example, primary clarifiers may be omitted from the wastewater treatment system. Due to the reduced amount of oxidized solids to be removed from the system, a final clarifier, such as the solid-liquid separation apparatus 140, may be reduced in size, in some embodiments by about 50%. Because a lower amount of BOD enters the fixed film reactor (for example, the fixed film reactor 130), the size of the fixed film reactor may be reduced, in some embodiments by about 30%. There is also a lesser requirement for oxygen in the fixed film reactor which allows for the capacity and power requirements of an aeration system in the fixed film reactor to also be reduced, in some embodiments by about 30%. The reduced size of the components of the treatment system provides for a decreased footprint of the system. For example, a wastewater treatment plant with a capacity to treat 35 million gallons per day (MGD) of wastewater with an influent BOD of 200 mg/L would require about 150,000 ft$^2$ of treatment units with a conventional design approach; with embodiments of the present invention the footprint could be reduced to about 75,000 ft$^2$.

In other embodiments of systems and methods, a wastewater treatment system, such as any of those described above, may further include an anaerobic treatment unit (an anaerobic digester). Non-limiting examples of components or portions of anaerobic systems that can be utilized in one or more configurations of the wastewater treatment systems include, but are not limited to, the DYSTOR® digester gas holder system, the CROWN® disintegration system, the PEARTH® digester gas mixing system, the PFT® spiral guided digester gas holder, the PFT® vertical guided digester holder, the DUO-DECK™ floating digester cover, and the PFT® heater and heat exchanger system, from Evoqua Water Technologies.

The anaerobic digester may be utilized to treat mixed liquor, which may include suspended solids, sludge, and/or solids-rich or solids-lean fluid streams, from one or more other treatment units of the wastewater treatment system. At least a portion of an anaerobically treated sludge produced in the anaerobic digester may be recycled back to one or more other treatment units of the wastewater treatment system. The nature and function of the anaerobic digester and associated recycle streams may be similar to those described in U.S. Pat. No. 8,894,856, titled "Hybrid aerobic and anaerobic wastewater and sludge treatment systems and methods," which is herein incorporated by reference in its entirety for all purposes.

The systems and components of embodiments of the invention may provide cost advantages relative to other wastewater treatment systems through the use of biological treatment processes in combination with anaerobic digestion. The wastewater treatment systems and processes of embodiments described herein can reduce sludge production through the use of various unit operations including aerobic and anaerobic biological processes and recycle streams. The wastewater treatment processes also overcome some of the technical difficulties associated with use of some anaerobic wastewater treatment processes, by, for example, concentrating or strengthening the sludge introduced into the anaerobic digester. Additionally, costs associated with use of a conventional aerobic stabilization unit are typically reduced because less aeration would typically be required in the aerobic processes due to the use of the anaerobic digester and various recycle streams. The various processes can also generate methane as a product of the anaerobic digestion process, which can be used as an energy source. In certain embodiments, a large portion of the chemical oxygen demand (COD) and BOD present in influent wastewater to be treated can be reduced using the anaerobic digester. This can reduce the aeration and oxygen requirements, and thus, operation costs of the wastewater treatment system, and increase the amount of methane produced that can be used as an energy source. Additionally, because anaerobic digestion can be used to reduce COD and BOD in the sludge, the sludge yield can also be reduced. The reduction of COD and/or BOD in the anaerobic treatment unit may also provide for a reduction in size of the stabilization tank or other aerobic treatment unit in the wastewater treatment system as compared to systems not utilizing the anaerobic digester.

Embodiments of the present invention may provide for the recirculation of aerobic bacteria, anaerobic bacteria, or both through various unit operations of the treatment system.

In certain embodiments, the contact tank is constantly seeded with nitrification bacteria (such as ammonia oxidizing and nitrite oxidizing biomass) which can survive the anaerobic digester and which can be recycled back to the aerobic environment. For example, nitrification and denitrification can take place in the contact tank. Nitrification may be carried out by two groups of slow-growing autotrophs: ammonium-oxidizing bacteria (AOB), which convert ammonia to nitrite, and nitrite-oxidizing bacteria (NOB), which oxidize nitrite to nitrate. Both are slow growers and strict aerobes. In some embodiments of treatment systems disclosed herein, the nitrification bacteria are introduced to and/or grown in a contact tank, where they are captured in the floc. Some of the nitrification bacteria will pass out from the contact tank and be sent to an anaerobic digester.

Figure 3:
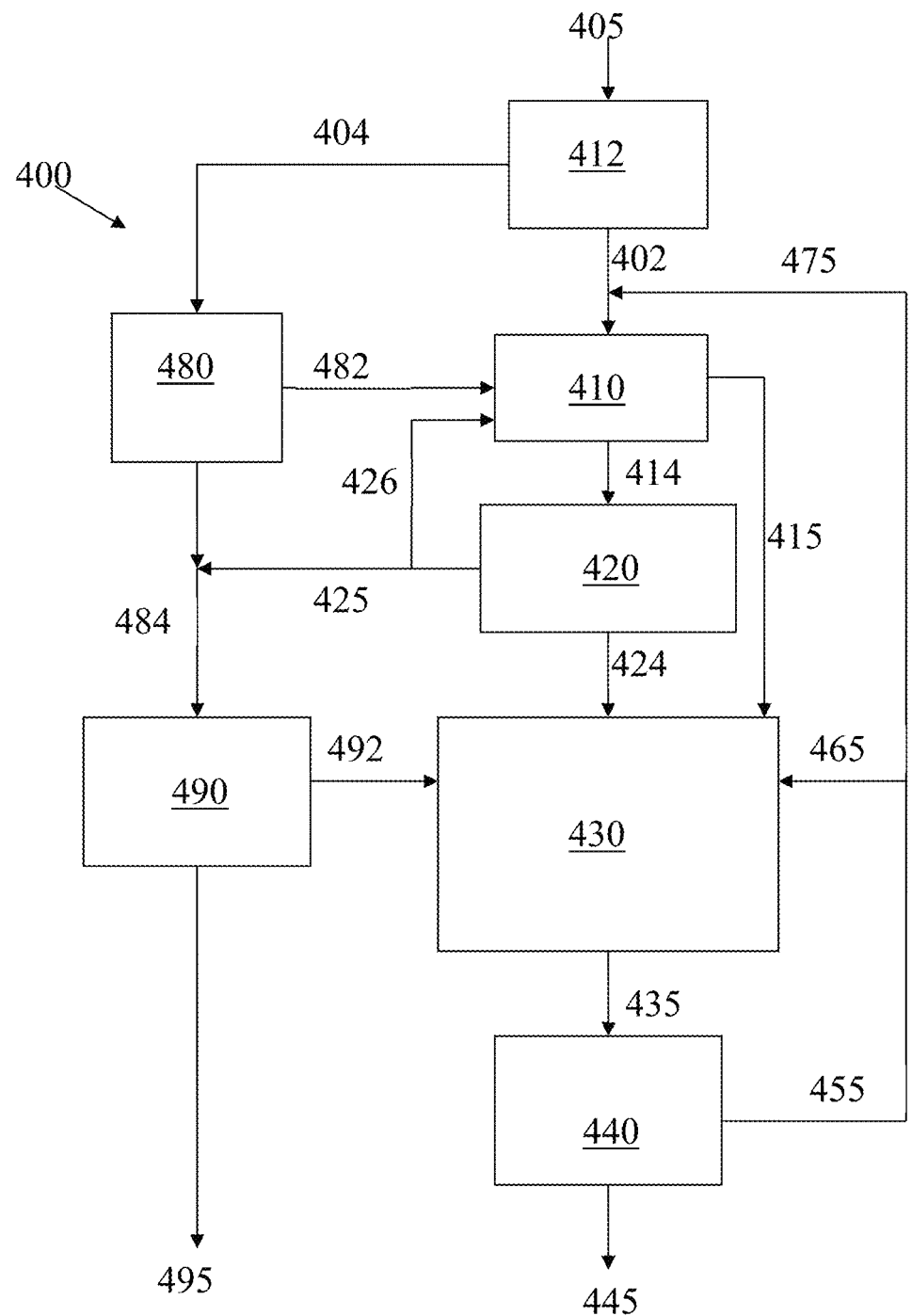
FIG. 3 is a block flow diagram of a wastewater treatment system in accordance with another embodiment.

A wastewater treatment system, indicated generally at 400 in FIG. 3, includes an anaerobic treatment unit 490, referred to herein as an anaerobic digester. The wastewater treatment system of FIG. 3 includes a contact tank 410, a DAF unit 420, a stabilization tank 430, a solid-liquid separation apparatus 440, and associated fluid conduits 414, 424, 435, 445, 455, 465, and 475 which are similar in structure and function to the contact tank 110, DAF unit 120, fixed film reactor 130, solid-liquid separation apparatus 140, and associated fluid conduits 114, 124, 135, 145, 155, 165, and 175 of the system illustrated in FIG. 1 and described above. A singular DAF unit 420 is illustrated in FIG. 3, although in alternate embodiments the treatment system may use multiple DAF units as described above with reference to the treatment system of FIG. 1.

In the system of FIG. 3, wastewater from a source of wastewater 405 is directed into a primary clarifier 412 through an inlet of the primary clarifier. A solids-rich fluid stream from the clarifier is directed through conduit 404 into an inlet of a thickener 480, which may comprise, for example, a gravity belt thickener. A solids-lean effluent from the primary clarifier 412 is directed into an inlet of the contact tank 410 through conduit 402. A solids-rich output stream from the thickener 480 is directed to an inlet of the anaerobic digester 490 through conduit 484. A solids-lean effluent from the thickener is directed to an inlet of the contact tank 410 through conduit 482. The anaerobic digester is also supplied with suspended solids removed from mixed liquor in the DAF unit 420 through conduits 425 and 484.

In some embodiments, a portion of the suspended solids removed from the mixed liquor in the DAF unit 420 may be recycled to the contact tank 410 through conduits 425 and 426 in a similar manner as the recycle of suspended solids removed in the DAF unit(s) 120 to the contact tank 110 described above with reference to FIG. 1.

The solids-rich output stream from the thickener 480 and any suspended solids from the DAF unit 420 introduced into the anaerobic digester 490 are combined and anaerobically digested in the anaerobic digester. The anaerobic digestion process can be operated at temperatures between about 20° C. and about 75° C., depending on the types of bacteria utilized during digestion. For example, use of mesophilic bacteria typically requires operating temperatures of between about 20° C. and about 45° C., while thermophilic bacteria typically require operating temperatures of between about 50° C. and about 75° C. In certain embodiments, the operating temperature may be between about 25° C. and about 35° C. to promote mesophilic activity rather than thermophilic activity. Depending on the other operating parameters, the retention time in the anaerobic digester can be between about seven and about 50 days retention time, and in some embodiments, between about 15 and about 30 days retention time. In certain embodiments, anaerobic digestion of mixed liquor in the anaerobic digester may result in a reduction in oxygen demand of the mixed liquor of about 50%.

A first portion of an anaerobically digested sludge produced in the anaerobic digester may be recycled through an outlet of the anaerobic digester and into the stabilization tank 430 through conduit 492. This recycle stream may facilitate retaining sufficient solids in the system to provide a desired residence time in the stabilization tank. The anaerobically digested sludge recycled to the stabilization tank may also seed the stabilization tank with nitrification bacteria to enhance the nitrification activity within an optional stabilization tank. The anaerobically digested sludge recycled into the stabilization tank may also contain methanogenic bacteria which are subsequently returned to the anaerobic digester to enhance the performance of the anaerobic digester as described above.

Figure 4:
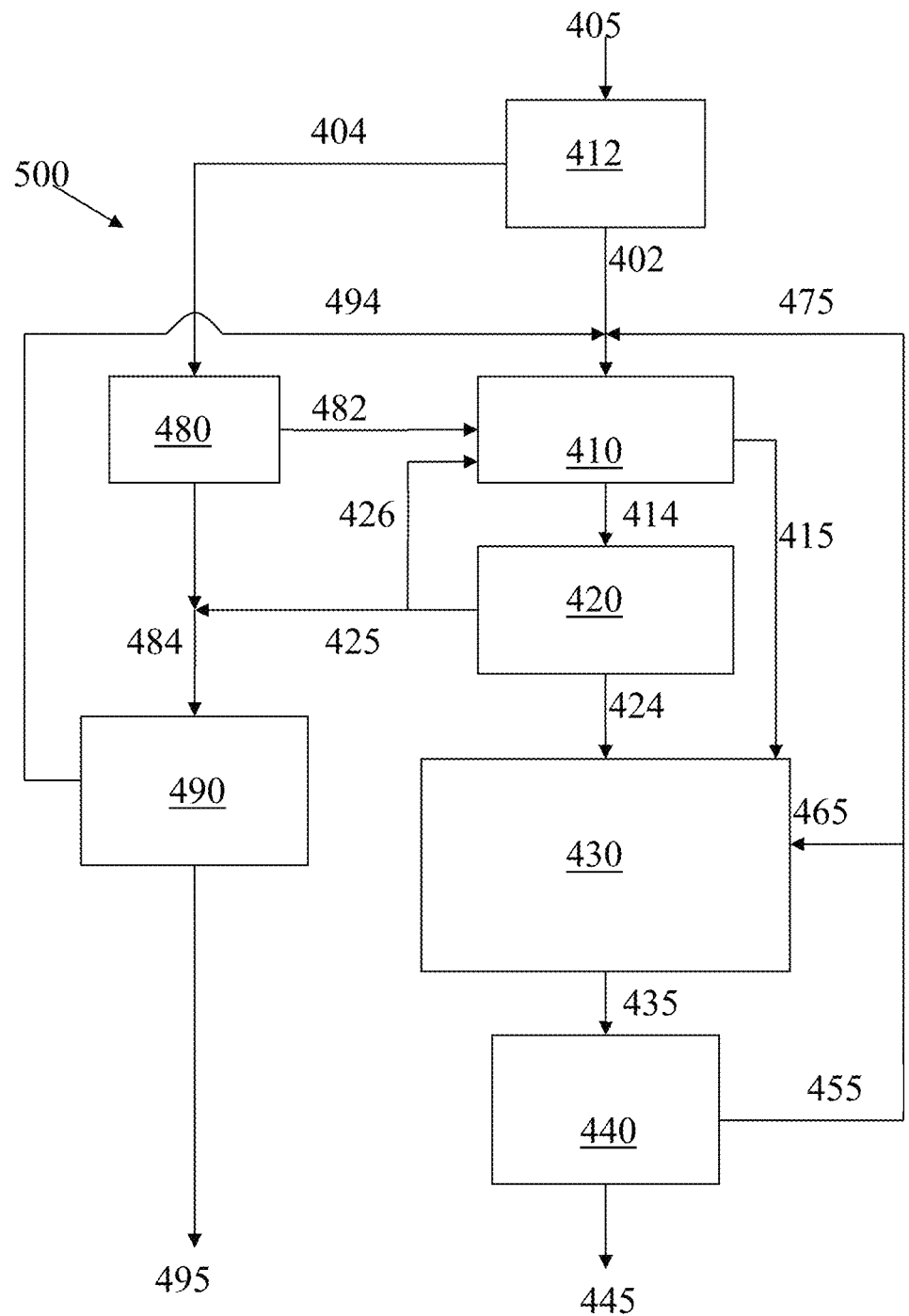
FIG. 4 is a block flow diagram of a wastewater treatment system in accordance with another embodiment.

In another embodiment of the wastewater treatment system, indicated generally at 500 in FIG. 4, the first portion of the anaerobically digested sludge produced in the anaerobic digester is recycled through an outlet of the anaerobic digester and into the inlet of the contact tank 410 through conduit 494, rather than into the stabilization tank 430. This recycle stream may facilitate providing sufficient waste sludge in the contact tank to adsorb/absorb or enmesh BOD present in the influent wastewater. The anaerobically digested sludge recycled to the contact tank may also seed the contact tank with nitrification bacteria to enhance the nitrification activity within the contact tank. The anaerobically digested sludge recycled into the contact tank may also contain methanogenic bacteria which are subsequently returned to the anaerobic digester to enhance the performance of the anaerobic digester as described above. The first portion of the anaerobically digested sludge recycled into the contact tank 410 may be any amount between about 0% and about 100% of the anaerobically digested sludge produced in and output from the anaerobic digester, with a second portion, making up the balance, sent out of the system as waste solids through conduit 495.

Figure 5:
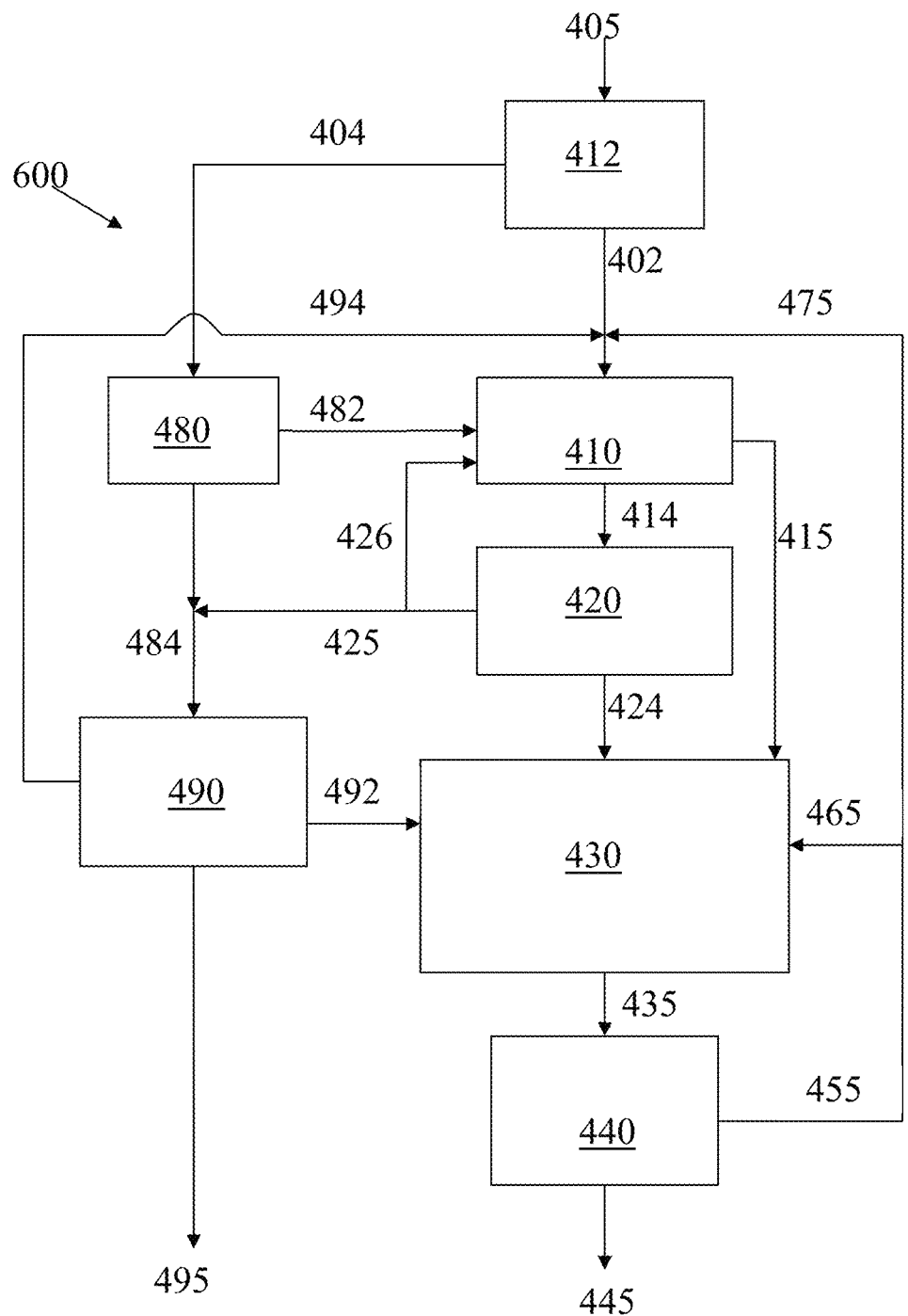
FIG. 5 is a block flow diagram of a wastewater treatment system in accordance with another embodiment.

In another embodiment of the wastewater treatment system, indicated generally at 600 in FIG. 5, a first portion of the anaerobically digested sludge produced in the anaerobic digester may be recycled through an outlet of the anaerobic digester and into the inlet of the contact tank 410 through conduit 494, and a second portion of the anaerobically digested sludge may be recycled through an outlet of the anaerobic digester and into the stabilization tank 430 through conduit 492. These recycle streams may provide the benefits described above with regard to systems 400 and 500. A third portion of the anaerobically digested sludge may be directed to waste through conduit 495. The sum of the first portion of the anaerobically digested sludge and the second portion of the anaerobic sludge may be any amount between about 0% and about 100% of the anaerobically digested sludge produced in and output from the anaerobic digester, with the third portion, making up the balance, sent out of the system as waste solids through conduit 495. The recycled anaerobic sludge may be split in any desired ratio between the first portion and the second portion. The first portion may comprise from about 0% to about 100% of all the anaerobically digested sludge produced in and output from the anaerobic digester with the sum of the second portion and the third portion making up the balance.

Figure 6:
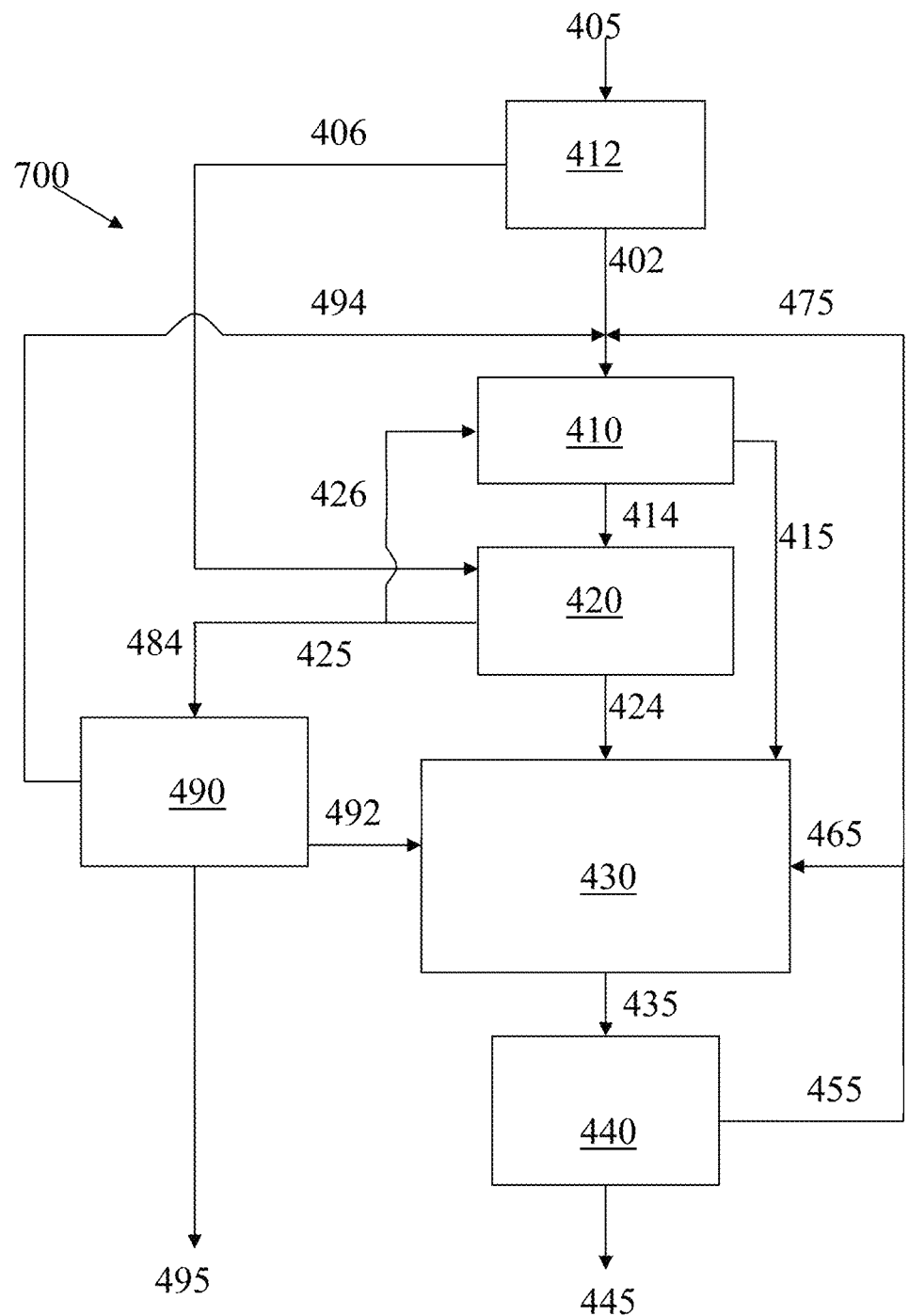
FIG. 6 is a block flow diagram of a wastewater treatment system in accordance with another embodiment.

Another embodiment of the wastewater treatment system, indicated generally at 700 in FIG. 6, is similar to that illustrated in FIG. 5, however the thickener 480 is not utilized. Rather, the solids-rich fluid stream from the primary clarifier is directed through conduit 406 into an inlet of the DAF unit 420. The DAF unit 420 of the system illustrated in FIG. 6 performs the function of the thickener 480 of the system illustrated in FIG. 5. The utilization of the DAF unit 420 to perform the function of the thickener may reduce or eliminate the need for a thickener in the system, which may reduce both capital and operational costs of the system. A first portion of the anaerobically digested sludge created in the anaerobic digester 490 is recycled to the contact tank 410 and a second portion is recycled to the stabilization tank 430 to provide the benefits described above. A third portion of the anaerobically digested sludge is directed to waste through conduit 495.

The aeration may promote microbial growth, increase TSS, and promote adsorption/absorption of BOD, as previously described. The wastewater may be provided with sufficient oxygen such that aerobic conditions are maintained in at least a portion of the wastewater. Suspended and dissolved solids in the wastewater, including BOD, may become oxidized. The residence time of the wastewater in the aeration unit may be sufficient for a significant amount of oxidation of the BOD to occur. In some embodiments, for example, at least about 10% of the BOD is oxidized prior to entering the contact tank. The residence time of the wastewater in the aeration unit is in some embodiments from about 5 minutes to about 90 minutes, and in some embodiments, from about 15 minutes to about 45 minutes. The residence time may be adjusted depending upon factors such as the BOD of the influent wastewater. A wastewater with a higher BOD may require longer treatment in the aeration unit than wastewater with a lower BOD.

In some embodiments, as previously described, the contact tank may be aerated. In certain embodiments, the contact tank is aerated more than the aeration unit. In other embodiments, the contact tank and the aeration unit are aerated at substantially the same rate. In other embodiments, the contact tank is not aerated, such that most or all primary aeration of the wastewater occurs upstream from the contact tank.

Aerating the wastewater to be treated prior to directing the wastewater to the contact tank may provide one or more benefits, for example, more biogas production, less energy consumption, and smaller system footprint. Briefly, by aerating the wastewater upstream from the contact tank, the amount of TSS in the contact tank may further be increased as compared to methods not including an upstream aeration step. As previously described, the increased TSS level in the contact tank may provide for additional soluble BOD to be adsorbed/absorbed in the contact tank as compared to a contact tank having a lower level of TSS. In some embodiments, a desirable TSS level in the contact tank may be between about 1,200 mg/L and about 3,500 mg/L. Alternatively, certain methods may enable soluble BOD to be adsorbed/absorbed in the aeration unit as compared to the contact tank. In such embodiments, the desirable TSS level in the contact tank may be less than 3,500 mg/L, for example, between about 600 mg/L and about 2,400 mg/L.

Aerating the wastewater upstream from the contact tank, for example, in the aeration unit, may additionally or alternatively reduce necessary volume of the contact tank. In some embodiments, the contact tank positioned downstream from an aeration unit may be at least about 70% smaller than a contact tank in a system without a primary aeration unit. The contact tank may be at least about 60%, at least about 50%, at least about 40%, at least about 30%, or at least about 20% smaller than a contact tank in a system without an upstream aeration unit.

In some embodiments, the wastewater to be treated may be high soluble, low particulate organic content wastewater. The wastewater may have a higher solids content than municipal wastewater. For example, the wastewater may have a suspended solids content of at least about 5%. The wastewater may have a suspended solids content of at least about 7%, at least about 10%, at least about 15%, or at least about 20%. For instance, the methods described herein may enable treatment of industrial wastewater by dissolved air flotation. As disclosed herein, industrial wastewater includes wastewater associated with an industrial process or system. The characteristics of industrial wastewater may generally be dependent on the industry. In some embodiments, the industrial wastewater has more than 300 mg/L or more than 500 mg/L TSS; more than 300 mg/L or more than 350 mg/L BOD; more than 750 mg/L or more than 1000 mg/L COD; or more than 750 mg/L or more than 1000 mg/L total dissolved solids (TDS).

The aeration unit may be a short hydraulic retention time (HRT) aeration chamber. Generally, aeration may include delivering an oxygen containing gas, for example, air, into a tank with the wastewater. The gas may be dispersed through the wastewater by one or more pumps.

In some embodiments, the aeration unit may provide upstream treatment of the wastewater prior to contacting the wastewater with waste sludge. In other embodiments, at least a portion of the waste sludge may be recycled to the aeration unit, to provide primary adsorption/absorption of BOD in the wastewater. Suspended and dissolved solids in the wastewater, including BOD, may be adsorbed/absorbed into the waste sludge in the aeration unit, forming a first mixed liquor. The residence time of the wastewater in the aeration unit may be sufficient for the majority of the BOD to be adsorbed/absorbed by the waste sludge. In some embodiments, the residence time of the wastewater in the aeration unit may be sufficient for more BOD to be adsorbed/absorbed in the aeration unit than downstream in the contact tank. The amount of solids recycled to the aeration unit may range from about 1% to about 100% of a total amount of solids removed from the DAF unit(s). The amount of waste sludge recycled to the aeration unit may be a majority of a total amount of waste sludge recycled, for example, greater than about 50%, between about 50% and about 95%, or between about 60% and about 80% of the total amount of waste sludge recycled. In some embodiments, the amount of waste sludge recycled to the aeration unit is greater than the amount of waste sludge recycled to the contact tank. The amount of waste sludge recycled to the aeration unit may be greater than the amount of waste sludge recycled to the contact tank and to any other unit, for example, the fixed film reactor.

In some embodiments, at least a portion of the suspended solids removed in the DAF unit(s) may be recycled to the aeration unit. Recycling solids removed in the DAF unit(s) to the aeration unit may provide for greater oxidation of BOD in the aeration unit than in the contact tank because the solids recycled to the aeration unit include living bacteria capable of oxidizing BOD. The amount of solids recycled to the aeration unit may range from about 1% to about 100% of a total amount of solids removed from the DAF unit(s). The amount of solids recycled to the aeration unit may be a majority of a total amount of solids removed from the DAF unit(s), for example, greater than about 50%, between about 50% and about 95%, or between about 60% and about 80% of the total amount of solids removed in the DAF unit(s). In some embodiments, the amount of solids recycled to the aeration unit is greater than the amount of solids recycled to the contact tank. The amount of solids recycled to the aeration unit may be greater than the amount of solids recycled to the contact tank and any other conduit, for example, an anaerobic digester.

Figure 7:
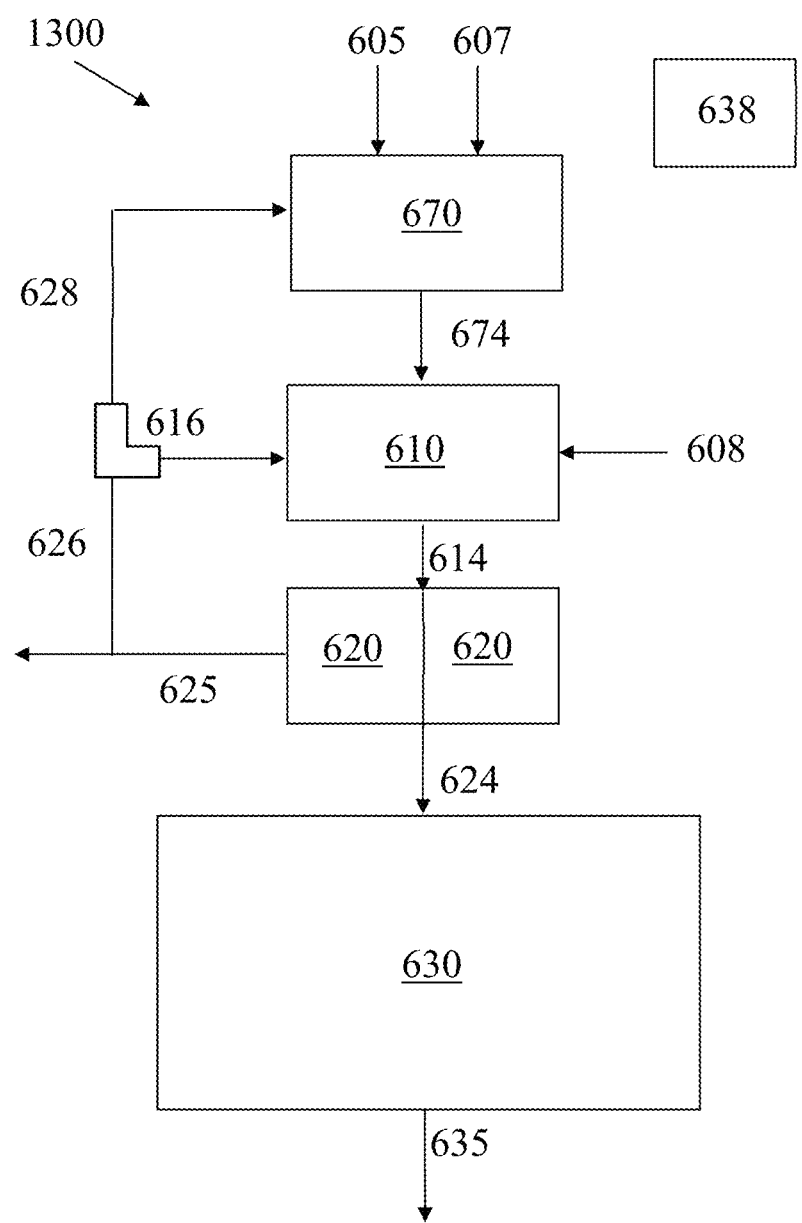
FIG. 7 is a block flow diagram of a wastewater treatment system in accordance with another embodiment.

Another embodiment, indicated generally at 1300, is provided in FIG. 7. The system 1300 includes an aeration unit 670, a contact tank 610, a DAF unit 620, a fixed film reactor 630, and associated fluid conduits 614, 624, 635, 625, and 626, which are similar in structure and function to elements of the systems illustrated in FIGS. 1 and 2. The system 1300 includes fluid conduit 628 extending between the fixed film reactor 620 and the aeration unit 670 (through fluid conduits 625 and 626). The system 1300 includes fluid conduit 674 extending between the aeration unit 670 and the contact tank 610. Two DAF units 620 are illustrated in FIG. 8, although in alternate embodiments the treatment system may use a single DAF unit as shown, for example, in the treatment system of FIG. 3.

In system 1300, wastewater from a source of wastewater 605 is directed into an aeration unit 670 through an inlet of the aeration unit. An oxygen containing gas from a source of gas 607 is directed into the aeration unit 670 through another inlet of the aeration unit. The oxygen containing gas may treat the wastewater by aeration to form an aerated mixed liquor. The aerated mixed liquor is directed into contact tank 610. Downstream from contact tank 610, gas from a source of gas 608 is directed into DAF unit 620 to float suspended solids. Further downstream, the process liquid flows through stabilization tank 630, as previously described herein.

System 1300 includes controller 638 and metering valve 616 which are operably connected to each other. Metering valve 616 may be positioned and configured to selectively direct floated solids from DAF unit 620 to aeration unit 670 (through conduits 625, 626, and 628) and contact tank 610 (through conduits 625 and 626). Controller 638 may be configured to instruct the metering valve 616 to selectively direct floated solids, as previously described.

Figure 8:
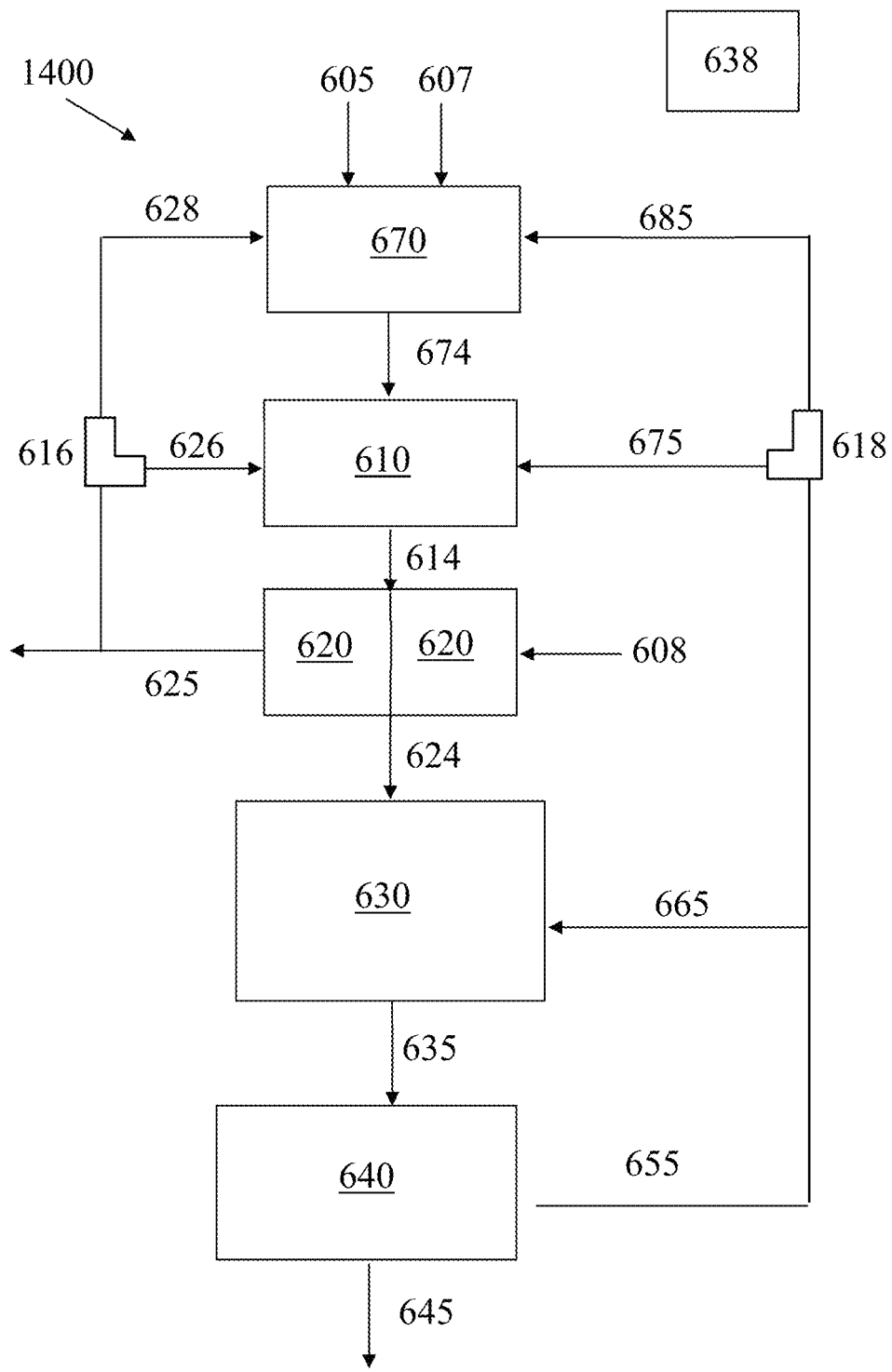
FIG. 8 is a block flow diagram of a wastewater treatment system in accordance with another embodiment.

Another embodiment indicated generally at 1400 is shown in FIG. 8. System 1400 is similar to system 1300 but further includes a solid-liquid separation apparatus 640 and associated fluid conduits 645, 655, 665, and 675, which are similar in structure and function to elements of the system illustrated in FIG. 1. System 1400 includes fluid conduit 685 extending between the solids-liquid separation unit 640 and the aeration unit 670. System 1400 includes metering valve 618 which is operably connected to controller 638. Controller 638, shown in FIG. 8, is operably connected to metering valves 616 and 618, but in certain embodiments separate controllers may be provided for each metering valve. Metering valve 618 may be positioned and configured to selectively direct waste sludge from solids-liquid separation unit 640 to aeration unit 670 (through conduit 685) and contact tank 610 (through conduit 675). Controller 638 may be configured to instruct the metering valve 618 to selectively direct waste sludge, as previously described.

The controllers disclosed herein may be programmed to operate metering valves automatically, for example, on a schedule or responsive to a measurement or calculation received or determined by the controller. For example, in some embodiments, the controller may obtain a measurement associated with the composition of the wastewater. The controller may operate one or more metering valve to adjust treatment of the wastewater in one or more unit operations. The controller 638 may operate one or more pump to adjust treatment of the wastewater in the system. The measurement may be input manually or obtained from a sensor operably connected to the controller. Any controllers, sensors, metering valves, or pumps known to one of ordinary skill in the art may be provided to operate as described herein.

Figure 9:
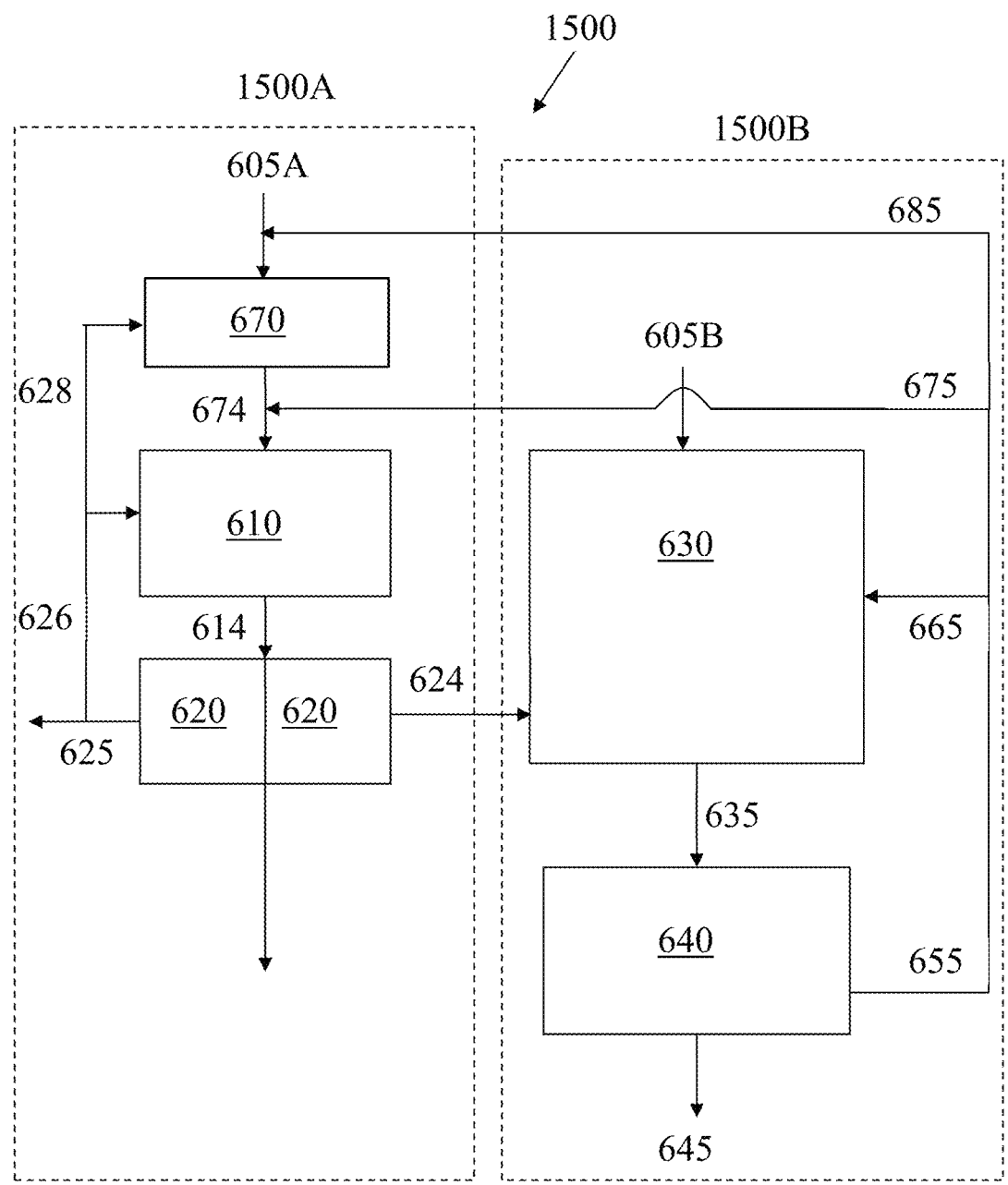
FIG. 9 is a block flow diagram of a wastewater treatment system in accordance with another embodiment.

Another embodiment indicated generally at 1500, is illustrated in FIG. 9. In this embodiment, the wastewater treatment system 1500 is broken into two separate but interconnected subsystems, one subsystem 1500A including aeration unit 670, contact tank 610 and DAF unit(s) 620, and a second subsystem 1500B including fixed film reactor 630 and solids-liquid separation unit 640. As shown in FIG. 9, aeration unit 670 and contact tank 610 are two separate treatment tanks, although in some embodiments the units may be included in the same treatment tank. As shown in FIG. 9, in the first subsystem 1500A influent wastewater from a source of wastewater 605A is directed into the aeration unit 670. In the second subsystem 1500B influent wastewater from a source of wastewater 605B is directed into the fixed film reactor 630. The subsystems of FIG. 9 are similar in structure and function to elements of the subsystems illustrated in FIG. 2.

Figure 10:
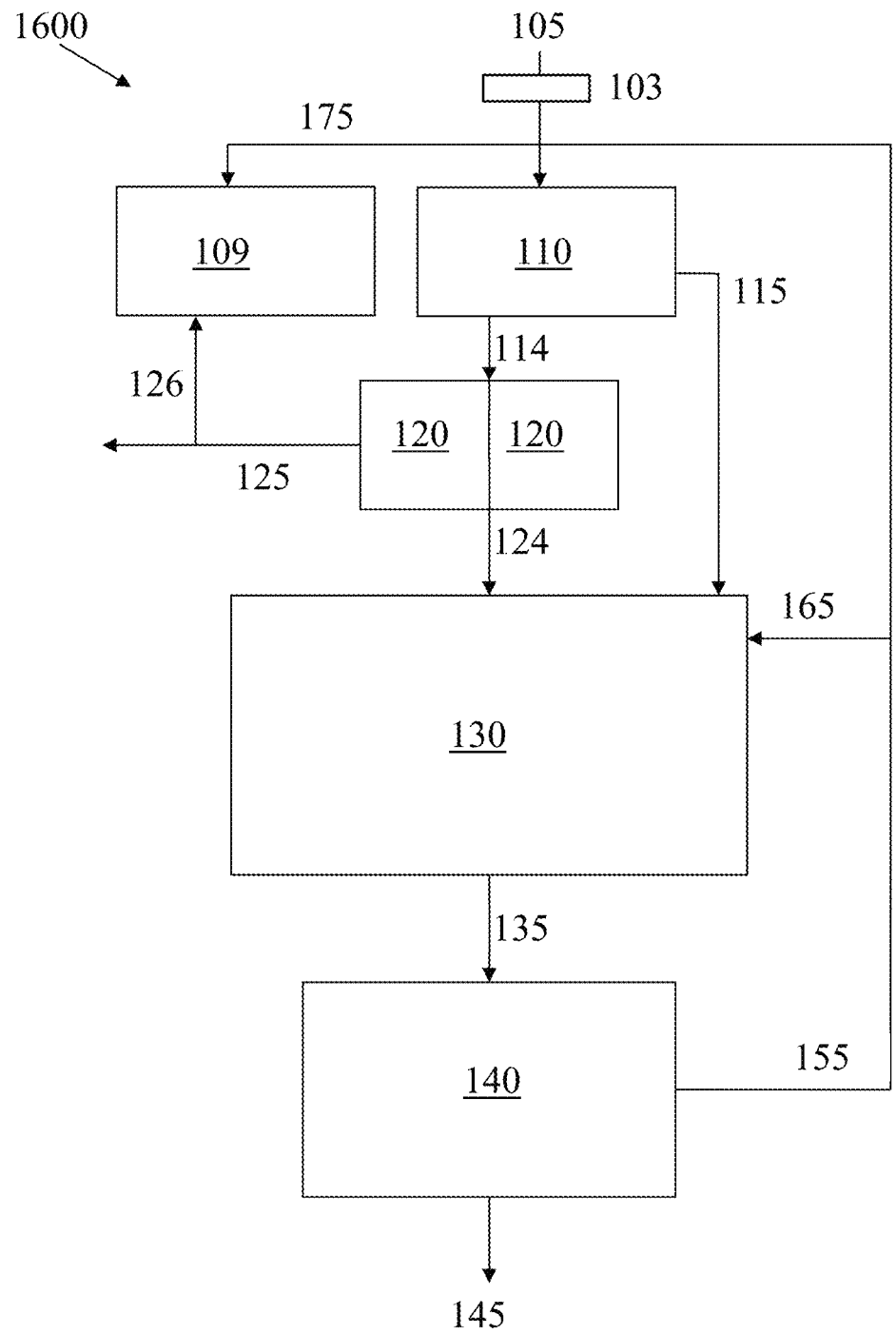
FIG. 10 is a block flow diagram of a wastewater treatment system in accordance with another embodiment.

Another embodiment, indicated generally as 1600, is shown in FIG. 10. System 1600 is similar to system 100 but includes a sludge mixing tank 109 upstream from the contact tank 110. Wastewater from a source of wastewater 105 is directed into a contact tank 110 through an inlet of the contact tank. Waste sludge is recycled through conduit 175 from the downstream fixed film reactor 130 and floated solids from the DAF unit 120 are recycled through conduit 126 to the sludge mixing tank 109, where the sludge may be mixed and aerated. Sludge from a sludge stabilization operation (not shown) may additionally be added to the sludge mixing tank 109. System 1600 may additionally include solids screen 103 positioned downstream from the source of wastewater. The solids-screen may be configured for separation of non-biological waste solids.

Figure 11:
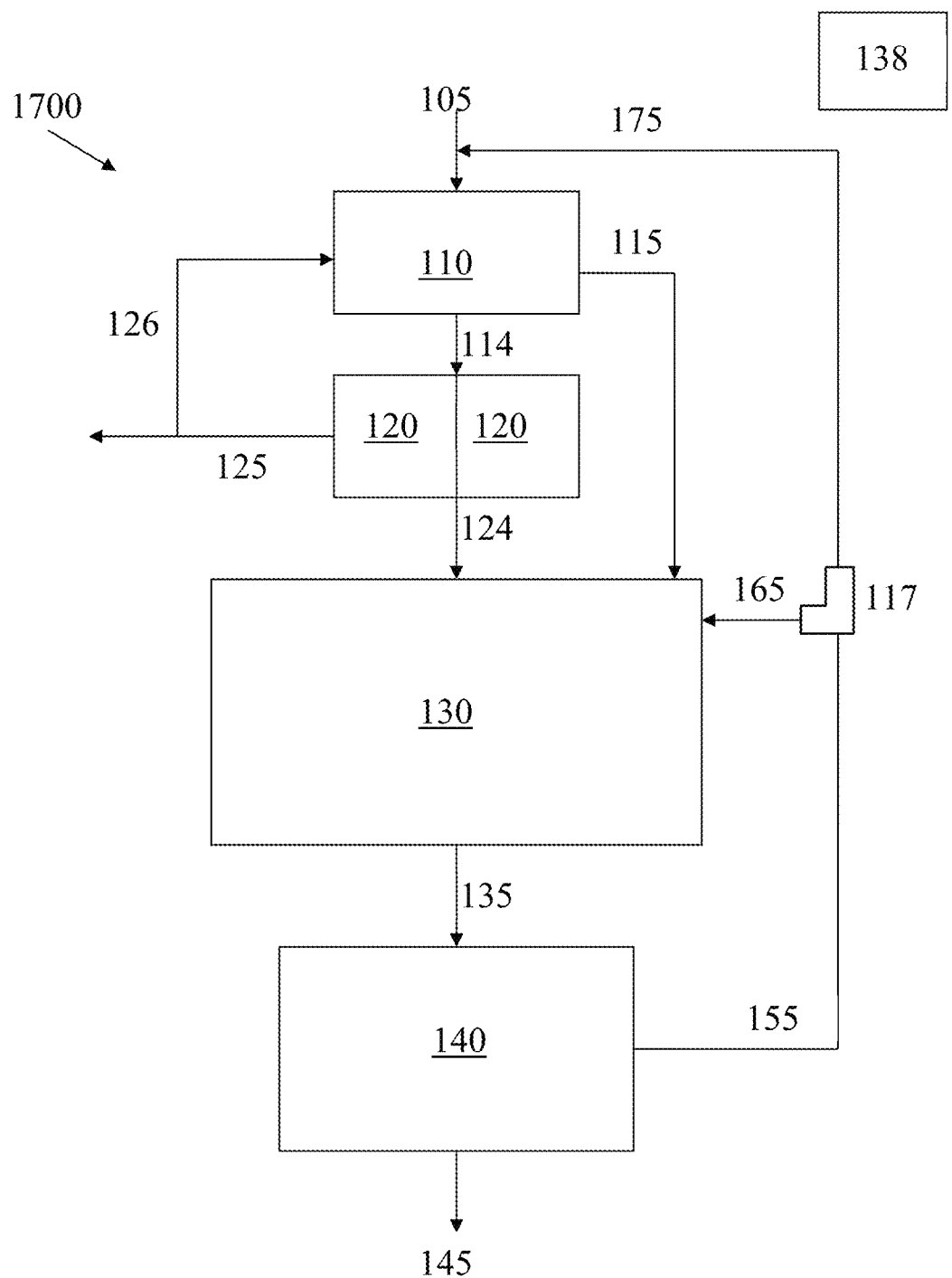
FIG. 11 is a block flow diagram of a wastewater treatment system in accordance with another embodiment.

Another embodiment, indicated generally as 1700, is shown in FIG. 11. System 1700 is similar to system 100 but includes controller 138 and metering valve 117. Controller 138 and metering valve 117 may be operably connected to each other. Metering valve 117 may be positioned and configured to selectively direct waste sludge from the solid-liquid separation unit 140 to contact tank 110 (through conduit 175) and fixed film reactor 130 (through conduit 165). Controller 138 may be configured to instruct the metering valve 117 to selectively direct the waste sludge, as previously described. In particular, the waste sludge may be split in any desired ratio between the contact tank 110 and the fixed film reactor 130. The contact tank 110 may receive from about 0% to about 100% of all the waste sludge produced in and output from the solid-liquid separation unit 140 with the waste sludge delivered to the fixed film reactor 130 making up the balance. In some embodiments, a sensor (not shown) configured to measure the concentration of contaminants in the wastewater may be operatively connected to the controller 138. In general, a greater proportion of the waste sludge may be delivered to the contact tank 110 for treatment of wastewater having a greater concentration of contaminants. In certain embodiments, for instance embodiments in which the system includes sludge mixing tank (for example, system 1600), the controller 138 may be configured to selectively direct waste sludge to the sludge mixing tank and the fixed film reactor 130.

EXAMPLES

The embodiments may be further understood with reference to the following examples. The examples are intended to serve as an illustration and are not limiting.

Example 1

TSS Removal and Particulate COD Removal

To determine the ability of a wastewater treatment system described herein to operate at various flowrates and the effect of flow rate on TSS removal and particulate COD (pCOD) removal, a pilot test plant conducted trials combining a DAF unit with a contact tank. The demonstration-size system operated at 50 m$^3$/hr and used a commercial size DAF unit with a 5.95 m$^2$ surface area to provide a surface overflow rate (SOR) of 8.5 m/hr for baseline test conditions. Additionally, a 32 m$^3$ contact tank was used. The plant operated with a trickling filter solids contact (TF-SC) process in conjunction with the DAF unit.

Three separate flow rate conditions were tested at two different test plants: one for the baseline flowrate (50 m$^3$/hr), high flow rate (72.7 m$^3$/hr) and peak flow rate (110 m$^3$/hr). The peak flow rate could not be adequately accommodated for the operating conditions, so a high flow rate was investigated as well. The results can be found in Table 1 below.

TABLE 1

|  | Baseline Flow | High Flow | Peak Flow |
| --- | --- | --- | --- |
| Flow rate raw WW (m$^3$/hr) | 50 | 72.7 | 110 |
| DAF Influent TSS (mg/L) | 388 | 442 | 385 |
| *Mean Hydraulic loading rate (m/hr) | 8.4 | 12.2 | 18.4 |
| Solids loading rate (kg/m$^2$/hr) | 3.26 | 5.4 | 7.1 |
| Waste Sludge flow (m$^3$/hr) | 2.5 | 3.6 | 5.5 |
| A/S ratio (kg air/kg TSS) | 0.027 | 0.016 | 0.012 |
| Recycle Ratio, % | 20 | 14 | 9 |
| Dissolved Oxygen in Contact Tank (mg/L) | 0.6 | 0.6 | 1.18 |
| Mean TSS removal % | 60% | 51% | 25% |
| Mean pCOD removal % | 57% | 42% | 25% |

Performance of the DAF unit in the process shows an average of around 60% removal for both TSS and pCOD in the baseline flow rate. A decrease is shown when operating at the high flow rate conditions to about 50% and 40% removal for TSS and pCOD, respectively. The decrease can be explained by the different type of waste sludge solids, a smaller pressurized recycle skid in the high flow rate plant, and a correspondingly lower air to solid ratio. With a lower air to solids ratio and waste influent, a lower TSS and pCOD removal is expected. However, the results show that TSS and pCOD removal did not decrease significantly with increasing flow rate. The results also show that even under high flow rate conditions, the DAF and TF-SC system is capable of removing TSS and pCOD.

Example 2

Contaminant Removal Efficiency of a DAF Unit

Wastewater characteristics vary from location to location and thus influence the removal of TSS and BOD at any given point. To evaluate treatability of a potential application, bench scale testing was performed for a contact tank-DAF unit combination. The test protocol included performing a 30 minute contact with a dissolved oxygen concentration of about 1 mg/L followed by a 5 minute flotation. The contaminant concentrations are shown in the data presented in Table 2.

TABLE 2

|  | Concentration (mg/L) | | | | | Removal Efficiency (%) | | | | |
| --- | --- | --- | --- | --- | --- | --- | --- | --- | --- | --- |
| Parameter | TSS | COD | sCOD | BOD | sBOD | TSS | COD | sCOD | BOD | sBOD |
| Primary Influent | 450 | 802 | 135 | 293 | 51.8 | — | — | — | — | — |
| Aeration Basin | 2260 | 2500 | 658 | — | — | — | — | — | — | — |
| Pressure Recycle | 51 | 304 | 107 | 90 | 52.2 | — | — | — | — | — |
| Contact Tank | 482 | 757 | 81 | 288 | 26 | — | — | — | — | — |
| Flotation Effluent | 84 | 269 | 77 | 85 | 32.7 | 83% | 64% | 36% | 70% | 37% |

As shown in Table 2, the removal efficiencies for TSS, COD, and BOD are between 60-80%, while 40% of the sCOD and sBOD were removed. The results demonstrate the consistency of the contact tank and DAF unit combination in removing a significant amount of TSS as well as COD and BOD from an exemplary municipal wastewater.

Example 3

Primary Treatment with a DAF Unit and Contact Tank

To determine the effect of retrofitting a wastewater treatment system with the DAF unit and contact tank on TSS removal and soluble BOD (sBOD) removal on a larger scale, a full-scale plant treating 121,000 $m^3$ water/day using six DAF tanks, each 18 m by 6 m with a design overflow rate of 7.5 m/h was used.

Figure 12:
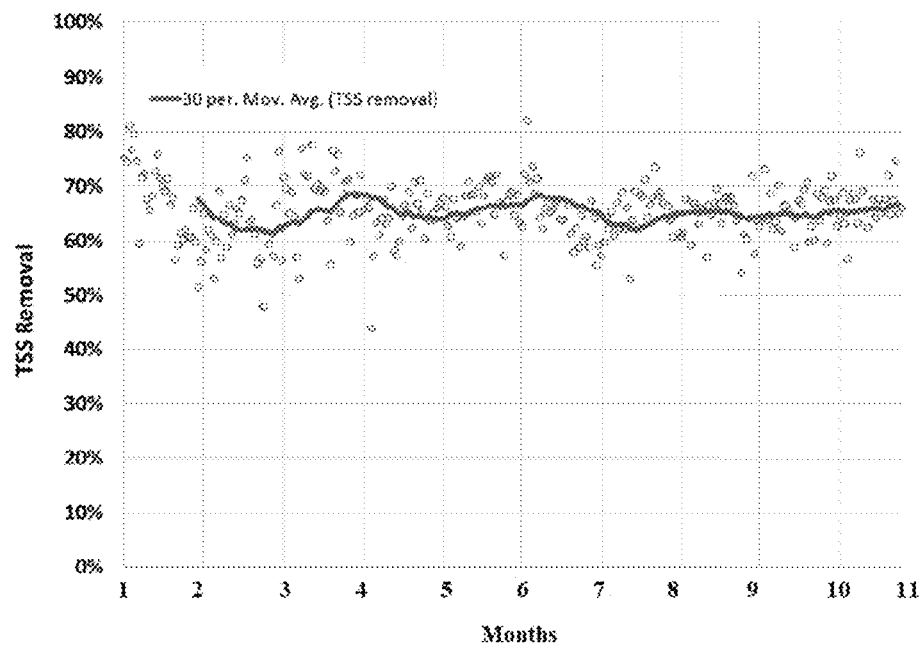
FIG. 12 is a graph of TSS removal by a method of treating wastewater in accordance with an embodiment.
Figure 13:
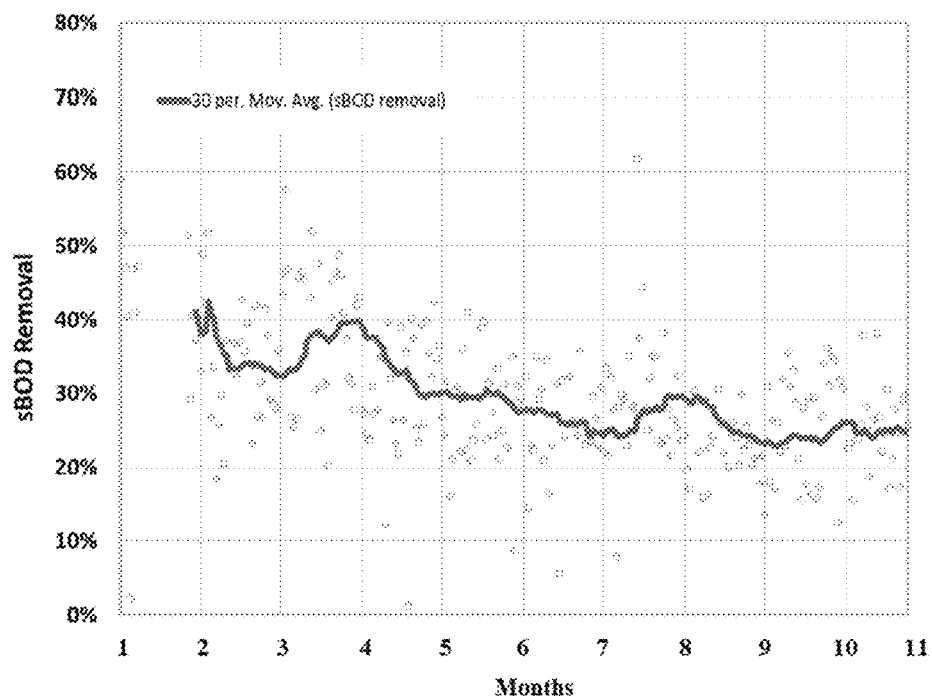
FIG. 13 is a graph of sBOD removal by a method of treating wastewater in accordance with an embodiment.

The results of TSS and soluble BOD (sBOD) removal are shown in FIG. 12 and FIG. 13 As shown in FIGS. 12 and 13, between 60-80% of TSS removal and 20-40% sBOD removal were achieved in the full-scale plant. The results are consistent with the small-scale results shown in Table 2 above.

The DAF unit and clarifier typically achieved about 65% TSS removal and 25-30% soluble BOD removal. The footprint reduction for the DAF unit and clarifier combination as compared to a primary clarifier is approximately 65% of a primary treatment operation

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A wastewater treatment system comprising: a contact tank having a first inlet fluidly connectable to a source of wastewater to be treated, a second inlet, and an outlet, the contact tank configured to treat the wastewater with waste sludge to form a mixed liquor; a dissolved air flotation unit having a first inlet fluidly connected to the outlet of the contact tank, a second inlet fluidly connectable to a source of gas, a floated solids outlet, and an effluent outlet, the dissolved air flotation unit configured to treat the mixed liquor with the gas to form floated solids and a dissolved air flotation unit effluent; a fixed film reactor having a first inlet fluidly connected to the effluent outlet of the dissolved air flotation unit, a second inlet, and an outlet, the fixed film reactor configured to form a fixed film effluent; a solid-liquid separation apparatus having an inlet fluidly connected to the outlet of the fixed film reactor, an effluent outlet, and a waste sludge outlet in fluid communication with the second inlet of the contact tank and the second inlet of the fixed film reactor; and a sludge mixing tank having a first inlet fluidly connected to the waste sludge outlet of the solid-liquid separation apparatus, a second inlet fluidly connected to the floated solids outlet of the dissolved air flotation unit, and an outlet fluidly connected to the second inlet of the contact tank.

2. The system of claim 1, wherein the fixed film reactor is an aerobic biological reactor.

3. The system of claim 2, wherein the fixed film reactor comprises media positioned within an aeration tank.

4. The system of claim 3, wherein the fixed film reactor comprises at least one of a trickling filter, a rotating biological contactor, and a moving bed biological reactor.

5. The system of claim 2, wherein the fixed film reactor comprises a media disk or panel.

6. The system of claim 2, wherein the fixed film reactor comprises randomly packed moving media.

7. The system of claim 1, wherein the sludge mixing tank has a third inlet fluidly connectable to a source of oxygen.

8. The system of claim 1, further comprising a screen positioned between the source of the wastewater and the contact tank.

9. The system of claim 1, wherein the fixed film effluent comprises about 50 mg/L to about 300 mg/L of biological solids.

10. The system of claim 1, wherein the system is configured to produce the dissolved air flotation unit effluent having between about 60% to about 70% less total suspended solids (TSS) than the source of the wastewater to be treated which is directed to the contact tank.

11. The system of claim 10, wherein the system is configured to produce the fixed film reactor effluent having at least about 20% less biochemical oxygen demand (BOD) than the dissolved air flotation unit effluent which is directed to the fixed film reactor.

12. A method of treating wastewater comprising:
introducing the wastewater and a waste sludge into a contact tank and mixing the wastewater with the waste sludge in the contact tank to form a mixed liquor;
directing at least a portion of the mixed liquor to a dissolved air flotation unit and separating the mixed liquor to form a dissolved air flotation unit effluent and waste biosolids;
directing the dissolved air flotation unit effluent to a fixed film reactor and biologically treating the dissolved air flotation unit effluent to form a fixed film effluent;
directing the fixed film effluent to a solid-liquid separation apparatus and separating the fixed film effluent to form a solids-lean effluent and the waste sludge;
selectively recycling a first portion of the waste sludge to a sludge mixing tank and a second portion of the waste sludge to the fixed film reactor;
directing the waste biosolids to the sludge mixing tank and mixing the waste biosolids with the first portion of the waste sludge to form a mixed sludge;
directing the mixed sludge to the contact tank; and
directing the solids-lean effluent to a treated wastewater outlet.

13. The method of claim 12, further comprising introducing the waste sludge into a first region of the contact tank and introducing the wastewater into a second region of the contact tank, the first region positioned upstream from the second region.

14. The method of claim 13, further comprising introducing a source of oxygen into the first region of the contact tank.

15. The method of claim 12, further comprising separating non-biological waste solids from the wastewater.

16. The method of claim 12, further comprising introducing at least one of a coagulant, a flocculant, or a ballast material to the fixed film reactor.

17. The method of claim 16, further comprising separating the ballast material from the fixed film effluent.

18. The method of claim 12, wherein separating the mixed liquor in the dissolved air flotation unit comprises reducing total suspended solids (TSS) of the mixed liquor by between about 60% and about 70% to form the dissolved air flotation unit effluent.

19. The method of claim 18, wherein biologically treating the dissolved air flotation unit effluent comprises reducing biochemical oxygen demand (BOD) of the dissolved air flotation unit effluent by at least about 20% to form the fixed film effluent.

* * * * *